United States Patent
Yui et al.

[11] Patent Number: 6,033,463
[45] Date of Patent: Mar. 7, 2000

[54] MULTICOLOR INK SET AND INK JET RECORDING METHOD

[75] Inventors: Toshitake Yui; Atsushi Suzuki; Nobuyuki Ichizawa; Kunichi Yamashita; Ken Hashimoto, all of Minami-Ashigara, Japan

[73] Assignee: Fuji Xerox Co., Ltd., Tokyo, Japan

[21] Appl. No.: 09/061,151

[22] Filed: Apr. 16, 1998

[30] Foreign Application Priority Data

Apr. 21, 1997 [JP] Japan ..................................... 9-103526

[51] Int. Cl.7 .................................................... C09D 11/02
[52] U.S. Cl. ..................................... 106/31.27; 106/31.28; 106/31.48; 106/31.49; 106/31.5; 106/31.52; 106/31.9
[58] Field of Search .............................. 106/31.27, 31.28, 106/31.49, 31.52, 31.48, 31.5, 31.9

[56] References Cited

U.S. PATENT DOCUMENTS

| | | | |
|---|---|---|---|
| 5,143,547 | 9/1992 | Kappele | 106/31.27 |
| 5,145,519 | 9/1992 | Kappele | 106/31.27 |
| 5,185,034 | 2/1993 | Webb et al. | 106/31.27 |
| 5,198,023 | 3/1993 | Stoffel | 106/31.27 |
| 5,221,334 | 6/1993 | Ma et al. | 106/31.6 |
| 5,273,573 | 12/1993 | Kappele | 106/31.27 |
| 5,342,440 | 8/1994 | Wickramanayake | 106/31.27 |
| 5,451,251 | 9/1995 | Mafune et al. | 106/31.48 |
| 5,624,484 | 4/1997 | Takahashi et al. | 106/31.75 |
| 5,853,465 | 12/1998 | Tsang et al. | 106/31.27 |

FOREIGN PATENT DOCUMENTS

| | | |
|---|---|---|
| 3-122171 | 5/1991 | Japan . |
| 7-47762 | 2/1995 | Japan . |

*Primary Examiner*—Helene Klemanski
*Attorney, Agent, or Firm*—Oliff & Berridge, PLC

[57] ABSTRACT

A multicolor ink set includes a black ink including at least a water-insoluble coloring material in which a carboxylic acid structure or a carboxylate salt structure is exposed to the surface, water, and a water-soluble organic solvent, and having a surface tension at 20° C. of from 30 to 60 mN/m, and a color ink including at least one or more water-soluble coloring material selected from cyan, magenta and yellow, water, and a water-soluble organic solvent, having a surface tension at 20° C. of from 20 to 50 mN/m and lower than that of the black ink, and 50% by weight or more of the water-soluble coloring material has a solubility in water at 20° C. of 10% by weight or less.

15 Claims, No Drawings

MULTICOLOR INK SET AND INK JET RECORDING METHOD

BACKGROUND OF THE INVENTION

1. Field of the Invention

The present invention relates to a multicolor ink set suitable for an ink jet recording method, and an ink jet recording method using the multicolor ink set.

2. Description of Related Art

A printer using an ink jet method in which liquid or molten solid ink is discharged through a nozzle, slit or porous film to effect recording on paper, cloth, film and the like has various merits such as small size, low cost, silence and the like. Black and white or fullcolor printers of the ink jet type are widely commercially available. Among them, the piezo ink jet method which uses a piezo-electric element or a thermal ink jet method in which a liquid drop is formed by the action of thermal energy so that recording is conducted has a lot of merits. For example, high speed printing is realized, high resolution is obtained, and the like.

For coloration in the ink jet recording method, inks such as black, cyan, magenta, yellow ink and the like are generally used, and these inks are required to have a lot of properties so that (1) a clear image is obtained on any type of paper without blotting of either primary or secondary colors, (2) a black letter image is clear and has no blotting, (3) storage stability of an image, particularly, water resistance and light resistance of an image is excellent, (4) fixation ability of an image is good, (5) there is no blotting between different colors on any paper, (6) there is no void or deletion in an image, and the like.

To satisfy these required various ink properties, a lot of ideas have been suggested, and carried out. For example, Japanese Patent Application Laid-Open (JP-A) No. 3-122,171, U.S. Pat. Nos. 5,185,034; 5,145,519; 5,273,573; 5,143,547 and the like report that excellent tone is obtained on exclusive coated paper for ink jet recording by combining specific dyes.

However, in this case, there are problems that tone is not sufficient on normal paper, or in particular, a black letter image is not clear, color reproducibility on an OHP sheet is not excellent, water resistance and light resistance of an image are not sufficient, and the like.

A lot of ideas have been suggested and carried out for improving storage stability of an image, in particular, water resistance in the ink jet recording method. For example, there is used a so-called "highly waterfastness dye" which is a dye using a carboxyl group as a hydrophilic group of a water-soluble dye. However, in this case, there is a problem that when a black ink mainly used for printing letters is wet, the letters become illegible, namely, the waterfastness of the black ink is still insufficient.

Therefore, use of a pigment as a coloring agent has been suggested. However, in this case, though approximately sufficient water resistance and light resistance are obtained, there are problems regarding reliability. A clear image can not be obtained especially a color image, clogging easily occurs in the point of a print nozzle and consequently a void or deletion in an image is easily caused, fixation ability of an image is poor, and the like.

On the other hand, there is also commercially available an ink jet recording apparatus using a multicolor ink set comprising only black ink in the form of pigment dispersed ink for obtaining a clear image and color ink in the form of dye ink. To use black ink in the form of pigment dispersed ink is very effective for improving water resistance and image quality. However, in this case, fixation ability onto a recording material such as paper, film and the like is problematical.

When a component which acts as a binder is added to ink for improving this fixing ability, clogging easily occurs. Therefore, the component can not be added in an amount sufficient to largely improve fixing ability. On the other hand, when ink is fully impregnated into paper, fixing ability is improved, but, there occur problems such as image concentration decreases, image blotting increases, and the like.

In the case of black ink, the surface tension is set at high level and the ink is designed so that impregnation into paper requires 10 seconds or more in view of prevention of expansion of an image and blotting, since the black ink is often used for printing letter images. There is a problem that if a full-color image is recorded using such a black ink, blotting occurs between different colors. This is more marked with normal paper. Therefore, a lot of ideas have been conventionally suggested. For example, U.S. Pat. No. 5,198,023 suggests preventing blotting between colors by combining black ink containing an anionic dye, and yellow ink containing a cationic dye and a polyvalent coagulant.

However, in this case, long term ink shelf life is problematical, and in a thermal ink jet method, burnt deposition on a heater, so-called kogation is a problem.

Further, Japanese Patent Application Laid-Open (JP-A) No. 7-47762 suggests a method in which when ink having quick penetration ability into paper and ink having slow penetration ability into paper are printed at the same position in order to reduce blotting between colors. However, in the case of this method, there is a problem that recording of an image takes a long time and increased printing speed can not be accomplished. Another method is suggested in which paper is heated by a heater. However, in this case, such problems as electric power consumption increases which result in cost rises, and the like arise. However, in these cases, excellent effects are not easily obtained by methods in which color ink dye concentrations are set to about 0.1 to 2.0% by weight and gradation properties are obtained by overprinting for the purpose of providing an image having a level of quality corresponding to that of a photograph. Namely, blotting into an image having different color becomes significant where a high volume of ink is printed per unit area in image parts adjacent to black ink. Therefore, undesirable results occur.

SUMMARY OF THE INVENTION

The present invention will solve the above conventional problems and achieve the following object. Namely, the object of the present invention is to provide a multicolor ink set and ink jet recording method suitable for obtaining a color image at high speed and with excellent fixation ability, the image satisfying the above-described desirable various ink properties, having excellent water resistance, light resistance and the like, and providing clear and appropriate image concentration free of blotting on any type of paper.

In order to achieve this object, the present invention provides a multicolor ink set comprising:

a black ink which contains at least a water-insoluble coloring material in which a carboxylic acid structure or carboxylate salt structure is exposed to the surface, water, and a water-soluble organic solvent, and which has a surface tension at 20° C. of from 30 to 60 mN/m, and a color ink which contains at least one or more water-soluble coloring materials selected from cyan, magenta and yellow, water, and a water-soluble organic solvent, which has a surface tension at 20° C. of from 20 to 50 mN/m and lower than that of the black ink, and 50% by weight or more of the water-soluble coloring material has a solubility in water at 20° C. of no more than 10% by weight.

In the multicolor ink set of the present invention, it is hypothesized that since the black ink contains a water-insoluble coloring material in which a carboxylic acid structure or a carboxylate salt structure is exposed to the surface and has specific surface tension, and the color ink contains a water-soluble coloring material having water-solubility in a specific range and has a specific surface tension, the black ink and the color ink provide a good balance between viscosity increasing speed depending on water evaporation and diffusing speed into paper fiber on paper, and therefore, excellent fixation ability and color reproducibility are satisfied at the same time. Further, in this multicolor ink set, it is hypothesized that since repulsion between respective coloring materials is high and re-dispersibility, re-solubility and the like deteriorate remarkably after drying or due to viscosity increases, even if different inks are placed adjacently, they do not mix, and consequently, blotting between colors is greatly reduced.

DESCRIPTION OF PREFERRED EMBODIMENTS OF THE INVENTION

The multicolor ink set and inkjet recording method of the present invention will be explained in detail below.

[Multicolor Ink Set]

The multicolor ink set of the present invention comprises at least a specific black ink and a specific color ink, and optionally, further comprises other components appropriately selected according to requirements unless they harm the object of the present invention.

[Black Ink]

The black ink contains at least a water-insoluble coloring material, water, and a water-soluble organic solvent.

Water-insoluble Coloring Material

The above-described water-insoluble coloring material is not particularly restricted providing it is a water-insoluble black coloring material, and can be appropriately selected according to the object, and examples thereof include a black pigment, magnetic fine particles, an oil-based dye and the like.

As the black coloring pigment, for example, carbon black and the like are suitably listed.

Examples of the above-described carbon black include furnace black, lamp black, acetylene black, channel black and the like.

As the above-described carbon black, commercially available products can be suitably used, and specific examples of the commercially available products include Raven 7000, Raven 1080 ULTRA, Raven 1060 ULTRA, Raven 790 ULTRA, Raven 780 ULTRA, Raven760 ULTRA, Raven5750, Raven5250, Raven5000 ULTRA II, Raven 3500, Raven 2000, Raven 1500, Raven 1250, Raven 1200, Raven 1190 ULTRA II, Raven 1170, Raven 1255 (the above-mentioned compounds are manufactured by Columbia Corp.), Regal 440 R, Regal 330 R, Regal 660 R, Mogul L, Monarch 700, Monarch 800, Monarch 880, Monarch 900, Monarch 1000, Monarch 1100, Monarch 1300, Monarch 1400, Black Pearl L, Valcan XC-72 R, Valcan XC-72 (the above-mentioned compounds are manufactured by Cabott Corp.), Color Black FW1, Color Black FW2, Color Black FW2V, Color Black FW18, Color Black FW200, Color Black S150, Color Black S160, Color Black S170, Printex 35, Printex U, Printex V, Printex 140 U, Printex 140 V, Special Black 6, Special Black 5, Special Black 4A, Special Black 4 (the above-mentioned compounds are manufactured by Degussa Corp.), No. 25, No.33, No. 40, No. 47, No. 52, No. 900, No. 2300, MCF-88, MA 600, MA 7, MA 8, MA 100 (the above-mentioned compounds are manufactured by Mitsubishi Chemical Corp., Ltd.) and the like.

Examples of the-above described magnetic fine particle include magnetite, ferrite, titanium black and the like.

Examples of the-above described oil-based dye include C. I. Solvent Black-3, -5, -7, -27, -28, -29, -34 and the like.

These water-insoluble coloring materials maybe used alone or in a combination of two or more. In the present invention, the water-insoluble coloring material is not limited to the above-described examples, and for example, an emulsion colored black and the like may further be used.

In the present invention, among these water-insoluble coloring materials, carbon black is particularly preferred in view of easily handling, and excellent black tone and the like.

The primary particle size of the above-described water-insoluble coloring material is usually from 10 to 60 nm, preferably from 15 to 50 nm. The mean volume diameter of the above-described water-insoluble coloring material is usually from 20 to 300 nm, preferably from 30 to 200 nm in black ink.

It is preferable that the primary particle size and volume-average particle size of the above-described water-insoluble coloring material are within the above-preferable ranges respectively, so that the object of the present invention can be effectively attained.

The above-described "primary particle size" can be measured, for example, by using an electron microscope and the like, which means the so-called mathematical primary particle size measured by electron microscope and the like. The above-described "mean volume diameter" can be measured, for example, by using a measuring apparatus such as UPA 9340 manufactured by Microtrac Corp., and the like. This "mean volume diameter" may be measured without diluting black ink, or optionally black ink may be diluted for the measurement. As the viscosity which is a parameter in this measurement, the viscosity of the measured material is used without any modification.

The concentration of the above-described water-insoluble coloring material in black ink is preferably from 2 to 10% by weight, more preferably from 3 to 8% by weight.

When the above-described content is less than 2% by weight, high concentration becomes difficult to obtain, and when over 10% by weight, viscosity of ink tends to increase and discharging stability tends to decrease.

The water-insoluble coloring material in the present invention is a water-insoluble coloring material in which carboxylic acid structure or carboxylate salt structure is exposed to the surface.

As the above-described water-insoluble coloring material in which a carboxylic acid structure or carboxylate salt structure is exposed to the surface, for example, a coloring material which itself has at least either the carboxylic acid structure or the carboxylate salt structure as a functional group, a coloring material which is obtained by bonding to or adsorbing to the surface of a coloring agent, a compound containing at least either the carboxylic acid structure or the carboxylate salt structure, and the like may be listed.

As the above-described compound containing at least one of the carboxylic acid structure and carboxylate salt structure is not particularly limited providing it contains at least one of the carboxylic acid structure and carboxylate salt structure and can bond to the above-described water-insoluble coloring material and can disperse the water-insoluble coloring material in black ink, and can be appropriately selected according to the object. For example, a dispersing agent and the like are suitably listed. Since the water-insoluble coloring material is prepared by being treated by a dispersing agent containing at least one of the carboxylic acid structure and carboxylate salt structure, the multicolor ink set is excellent in dispersing stability and the properties thereof can be easily controlled by pH and the like.

As the above-described dispersing agent, for example, surfactants, polymer dispersing agents and the like containing at least one of the carboxylic acid structure and carboxylate salt structure are listed. Among them, dispersing agents exemplified below are preferred, and dispersing agents used in the following examples are particularly preferred, in the present invention.

As the polymer dispersing agent, for example, polymers having a hydrophilic structure and a hydrophobic structure, and the like are suitably listed. These polymers may be any condensed polymer, addition polymer and the like.

Specific examples of such a polymer dispersing agent include a copolymer which is obtained by appropriately combining a monomer containing an $\alpha,\beta$-ethylenic unsaturated monomer having a hydrophilic group with a monomer containing an $\alpha,\beta$-ethylenic unsaturated monomer having a hydrophobic group and copolymerizing them, a homopolymer which is obtained by homopolymerizing a monomer containing an $\alpha,\beta$-ethylenic unsaturated monomer having a hydrophilic group, and the like.

As the above-described monomer containing an $\alpha,\beta$-ethylenic unsaturated monomer having a hydrophilic group, for example, monomers having a carboxylic acid and/or a carboxylate salt structure are suitably listed, and specific examples thereof include acrylic acid, methacrylic acid, crotonic acid, itaconic acid, itaconate monoester, maleic acid and the like.

As the above-described monomer containing an $\alpha,\beta$-ethylenic unsaturated monomer having a hydrophobic group, for example, styrene, styrene derivatives such as $\alpha$-methylstyrene, vinyltoluene and the like, alkyl acrylate, alkyl methacrylate, alkyl crotonate, alkyl itaconate, dialkyl itaconate, dialkyl maleate, and the like are listed.

Preferable examples of the above-described polymer dispersing agent composed of the copolymer include a styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer and the like.

In the present invention, the above-described polymer dispersing agent composed of the homopolymer or copolymer may be further appropriately copolymerized with a monomer having a substituent such as a polyoxyethylene group, sulfonate group, phosphate group, hydroxyl group and the like. Further, the copolymer having a substituent may be mixed and used with the polymer dispersing agent composed of the homopolymer or copolymer, together. In this case, the amount of the copolymer is usually 30% by weight or less, preferably 20% by weight or less based on the weight of the whole dispersing agent.

In the present invention, a monomer having a cationic functional group may be appropriately copolymerized with the above-described polymer, for the purpose of raising affinity between the dispersing agent with the water-insoluble coloring material having an acidic functional group on the surface such as carbon black and the like and enhancing dispersing stability of the water-insoluble coloring material in black ink.

Examples of the above-described monomer having a cationic functional group include alkylacrylamide, N,N-dimethylaminoethyl methacylate, N,N-dimethylaminoethyl acrylate, N,N-dimethylaminomethacrylamide, N,N-dimethylaminoacrylamide, vinylpyridine, vinylpyrrolidone and the like.

In the present invention, among the above-described polymer dispersing agents composed of the homopolymer or copolymer, a polymer dispersing agent composed of a homopolymer or copolymer having an acid as a hydrophilic group is preferably used in the form of a salt with a basic compound for enhancing the water-solubility.

Examples of the above-described basic compound include alkaline metal compounds containing an alkaline metal such as sodium, potassium, lithium and the like, onium compounds containing an ammonium ion, organic ammonium ion, phosphonium ion, sulfonium ion, oxonium ion, stibonium ion, stannonium, iodonium and the like.

These basic compounds may be used alone or in combinations of two or more. Among these basic compounds, an onium compound containing an ammonium ion is preferably contained for improving particularly fixation ability.

The kind of polymerization form of the above-described polymer dispersing agent composed of the copolymer is not particularly restricted, and may be any structure of a random copolymer, block copolymer, graft copolymer and the like.

The molecular weight of the above-described dispersing agent may be low. However, it is desirable to maintain dispersing stability by steric structure of a polymer dispersing agent for effectively accomplishing durability which is one object of the present invention. Further, for realizing discharging stability, the weight-average molecular weight of the polymer dispersing agent is preferably in the range of from 1000 to 10000, more preferably in the range of from 2000 to 9000, and particularly preferably in the range of from 2500 to 8000.

The amount added of the above-described dispersing agent in black ink differs depending on the kind of the above-described water-insoluble coloring material. It can not be generally stipulated, but is usually from 0.1 to 50% by weight, preferably from 1 to 40% by weight based on the water-insoluble coloring material.

In the present invention, a carboxylic acid and/or carboxylate salt may exist directly on the surface of the water-insoluble coloring material. This is accomplished, for example, by conducting surface treatment such as polymer graft treatment, plasma treatment, oxidation treatment, coupling reaction treatment and the like, on the surface of the water-insoluble coloring material. As the water-insoluble coloring material in which a carboxylic acid and/or carboxylate salt exists directly on the surface, for example, commercially available articles such as Cabojet 300 (manufactured by Cabott Corp.) and the like are listed.

Water

The above-described water is not particularly restricted, and examples thereof include tap water, distilled water, ion-exchanged water, ultra-pure water and the like, and among them, ultra-pure water is particularly preferable.

Water-soluble Organic Solvent

The above-described water-soluble organic solvent is not particularly restricted, and can be selected from known compounds appropriately corresponding to the object, and examples thereof include polyvalent alcohols such as ethylene glycol, diethylene glycol, propylene glycol, polypropylene glycol, butylene glycol, trietylene glycol, 1,5-pentane diol, 1,2,6-hexane triol, glycerine and the like, polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether and the like, nitrogen-containing solvents such as pyrrolidone, N-methyl-2-pyrrolidone, cyclohexylpyrrolidone, triethanol amine and the like, alcohols such as ethanol, isopropyl alocohol, butyl alcohol, benzyl alcohol and the like, sulfur-containing solvents such as thiodiethanol, thiodiglycerol, sulfolane, dimethylesulfoxide and the like, propylene carbonate, ethylene carbonate, and the like.

Other Components

In the present invention, other components appropriately selected may be added to black ink at the level where the object of the present invention is not harmed.

As the other components, surfactants, bases and the like are suitably listed.

As the surfactant, ampholytic surfactants, anionic surfactants, nonionic surfactants and the like are listed. In addition, silicone-based surfactants such as polysiloxane polyoxyethylene adducts and the like, fluorine-based surfactants such as oxyethylene perfluoroalkyl ether and the like, biosurfactants such as spiculisporic acid and rhamnolipide, lysolecithin, and the like may be used.

It is advantageous to add these surfactants to black ink because the surface tension of the black ink can be kept in desired range.

Examples of the ampholytic surfactant include betaine, sulfo betaine, sulfate betaine, imidazoline and the like.

Examples of the nonionic surfactant include polyoxyethylene nonylphenyl ether, polyoxyethylene octylphenyl ether, polyoxyethylene dodecylphenyl ether, polyoxyethylene alkyl ether, polyoxyethylene fatty ester, soribtan fatty ester, polyoxyethylene soribtan fatty ester, fatty acid alkylolamide, acetylene alcohol ethylene oxide adduct, polyethylene glycol polypropylene glycol block copolymer, polyoxyethylene ether of glycerine ester, polyoxyethylene ether of sorbitol ester, and the like.

Examples of the anionic surfactant include alkylbenzene sulfonate salt, alkylphenylsulfonate salt, alkylnaphthalene-sulfonate salt, high fatty acid salt, sulfate salt and sulfonate salt of high fatty ester, high alkylsulfosuccinate salt, and the like.

In the present invention, among these compounds, the nonionic surfactant and anionic surfactant are preferable since they do not exert a ready influence on the dispersed condition of the above-described water-insoluble coloring agent in black ink.

Examples of the above-described base include potassium hydroxide, sodium hydroxide, lithium hydroxide, ammonium hydroxide, triethanolamine, diethanolamide, ethanolamide, 2-amino-2-methyl-1-propanol, ammonia and the like. It is advantageous to add the above-described base to black ink since dispersion stability of the black ink can be enhanced.

Further, for controlling ink properties, polyethyleneimine, polyamines, polyvinylpyrrolidone, polyethylene glycol, cellulose derivatives such as ethylcellulose, carboxyethyl cellulose and the like, polysaccharides and derivatives thereof, in addition, water-soluble polymers and polymer emulsions, cyclodextrin, macrocyclic amines, dendrimer, crown ethers, urea and derivatives thereof, acetoamide, and the like may be added to black ink.

Further, optionally, an antioxidant, fungus proofing agent, electron conducting agent, antioxidant, ultraviolet ray absorbing agent, chelating agent, pH buffering agent, viscosity controlling agent, and the like may be added to black ink.

Examples of the viscosity controlling agent include methylcellulose, ethylcellulose and derivatives thereof, glycerines, polyglycerine and polyethylene oxide adducts and polypropylene oxide adducts thereof, and in addition, saccharides and derivatives thereof, and the like. Examples of the saccharides and derivatives thereof include glucose, fructose, mannitol, D-sorbitol, dextran, xanthan gum, curdran, cycloamylose, maltitol and derivatives thereof.

The pH of the black ink in the present invention is preferably from 6.0 to 10.0, more preferably from 7.0 to 9.0.

When the pH of the black ink is not in the above-described numerical range, it is not preferable because dispersion stability of the above-described water-insoluble coloring material in the black ink decreases.

The surface tension of the black ink at 20° C. in the present invention is required to be 30 to 65 mN/m, and preferably from 40 to 60 mN/m.

When the surface tension is less than 30 mN/m, blotting tends to occur on paper, and when over 65 mN/m, blotting between colors can not be well controlled.

The viscosity of the black ink at 20° C. in the present invention is preferably from 1.5 to 5.0 mPas, and particularly preferably from 1.6 to 4.0 mPas.

When the viscosity is less than 1.5 mPas, discharge stability tends to decrease, and when over 5.0 mPas, clogging tends to occur.

Preparation of Black Ink

The black ink in the present invention can be prepared, for example, by adding the above-described water-insoluble coloring material in a specific amount to an aqueous solution containing a specific amount of the above-described compound containing at least a carboxylic acid structure or a carboxylate salt structure, stirring the mixture sufficiently, then dispersing the mixture using a dispersing machine and the like, removing coarse particles by effecting centrifugal separation and the like, then, adding a specified solvent, additive and the like, and stirring, mixing and filtrating the resulting mixture. Further, the black ink can be prepared by, after mixing the specific solvent, adding a specific amount of the above-described compound having at least a carboxylic acid structure or carboxylate salt structure, adding the mixture to the above-described water-insoluble coloring material, and dispersing the resulting mixture with a dispersing machine.

Examples of the above-described dispersing machine include a colloid mill, flow jet mill, slasher mill, high speed disperser, ball mill, attriter, sand mill, sand grinder, ultrafinemill, augarmotormill, dynomill, perlmill, agitator mill, cobol mill, three-roll, two-roll, extruder, kneader, microfluidizer, ultimizer, laboratory homogenizer, ultrasonic homogenizer and the like. These dispersing machines may be used alone or in combinations of two or more, and can be appropriately selected from commercially available apparatuses.

[Color Ink]

The color ink of the present invention comprises at least one or more water-soluble coloring materials selected from cyan coloring materials, magenta coloring materials and yellow coloring materials, water, and a water-soluble organic solvent. Among these components, the cyan coloring material is selected from phthalocyanine compounds represented by the following general formula (A) and phthalocyanine compounds represented by the following general formula (B), the magenta coloring material is selected from compounds represented by the following general formula (C), and the yellow coloring material is selected from C.I. Direct Yellow 144, C.I. Direct Yellow 86 and compounds represented by the following general formula (D).

General formula (A)

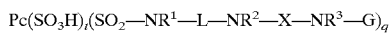

In the general formula (A), Pc represents a phthalocyanine nucleus containing metal. $R^1$, $R^2$ and $R^3$ may be the same or different, and represent each independently a hydrogen atom, an alkyl group or substituted alkyl group. L represents a divalent organic connecting group. G represents a colorless organic group substituted by at least one substituent selected from —COSH and —COOH. t+q is 3 to 4. X represents a carbonyl group, a group represented by the following formula (a), a group represented by the following formula (b), or a substituent represented by the following formula (c).

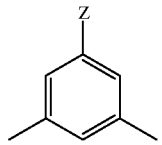

(a)

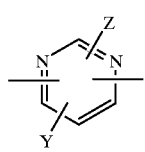

(b)

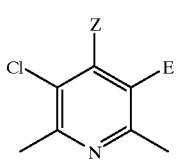

(c)

Wherein, Z represents —$NR^4R^5$, —$SR^6$ or —$OR^6$, Y represents a hydrogen atom, Cl, a zinc atom, —$SR^7$ or —$OR^7$. E represents Cl or —CN. $R^4$ $R^5$, $R^6$ and $R^7$ represent a hydrogen atom, an alkyl group or a substituted alkyl group.

General formula (B)

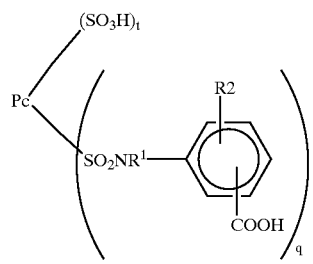

(B)

In the general formula (B), Pc represents a phthalocyanine nucleus containing metal. $R^1$ represents a hydrogen atom, an alkyl group, a substituted alkyl group, an alkenyl group, a substituted alkenyl group, an aralkyl group or a substituted aralkyl group. $R^2$ represents a hydrogen atom, an alkyl group, an alkoxy group, a halogen group, an amino group or a substituted amino group. t+q is 3 to 4. The general formula (B) has groups selected from —COSH and —COOH in a number equal to or more than that of —$SO_3H$.

General formula (C)

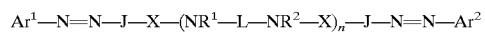

In the general formula (C), J represents a divalent substituent represented by the following formula.

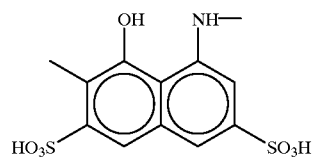

$Ar^1$ and $Ar^2$ may be the same or different, and represent an aryl group or a substituted aryl group. At least one of $Ar^1$ and $Ar^2$ has at least one substituent selected from —COSH and —COOH. $R^1$ and $R^2$ may be the same or different, and represent a hydrogen atom, an alkyl group, a substituted alkyl group, an alkenyl group or a substituted alkenyl group. L represents a divalent organic connecting group. n is 0 or 1. X represents a carbonyl group, a group represented by the following formula (1), a group represented by the following formula (2) or a group represented by the following formula (3).

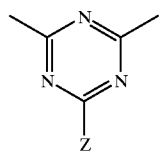

(1)

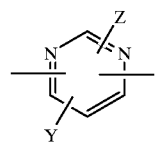

(2)

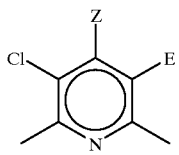

(3)

Wherein, Z represents —$NR^3R^4$, —$SR^5$ or —$OR^5$. Y represents a hydrogen atom, Cl, a zinc atom, —$SR^6$ or —$OR^6$. E represents Cl or —CN. $R^3$, $R^4$, $R^5$ and $R^6$ may be the same or different, and represent a hydrogen atom, an alkyl group, a substituted alkyl group, an alkenyl group, a substituted alkenyl group, an aralkyl group or a substituted aralkyl group. $R^3$ and $R^4$ may form a 5-membered or 6-membered ring together with a nitrogen atom.

General formula (D)

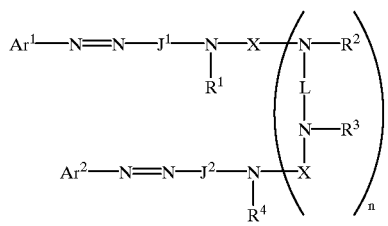

In the general formula (D), $Ar^1$ and $Ar^2$ may be the same or different, and represent an aryl group or a substituted aryl group. At least one of $Ar^1$ and $Ar^2$ has at least one substituent selected from —COSH and —COOH. $J^1$ and $J^2$ may be the same or different, and represent a substituent represented by the following formula (1), a substituent represented by the following formula (2) or a substituent represented by the following formula (3).

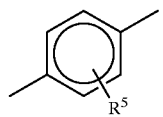  (1)

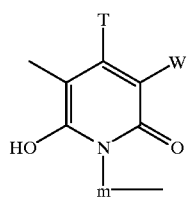  (2)

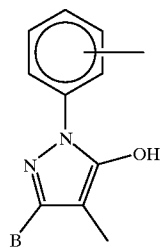  (3)

Wherein, $R^5$ represents a substituent selected from a hydrogen atom, a alkyl group, a substituted alkyl group, an alkoxyhalogen group, —CN, a ureide group and —NHCOR$^6$. $R^6$ represents a hydrogen atom, an alkyl group, a substituted alkyl group, an aryl group, a substituted aryl group, an aralkyl group or a substituted aralkyl group. T represents an alkyl group. W represents a hydrogen atom, —CN, —CONR$^{10}$R$^{11}$, a pyridinium group or —COOH. m represents an alkylene chain having 2 to 8 carbon atoms. B represents a hydrogen atom, an alkyl group or —COOH.

$R^1$, $R^2$, $R^3$, $R^4$, $R^{10}$ and $R^{11}$ may be the same or different, and represent a hydrogen atom, an alkyl group or a substituted alkyl group. L represents a divalent organic connecting group. X represents a carbonyl group, a substituent represented by the following formula (4), a substituent represented by the following formula (5) or a substituent represented by the following formula (6).

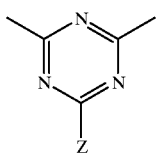  (4)

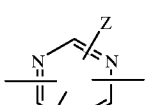  (5)

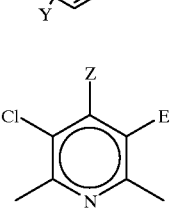  (6)

Wherein, Z represents —OR$^7$, —SR$^7$ or —NR$^8$R$^9$. Y represents a hydrogen atom, Cl or —CN. E represents Cl or —CN. $R^7$, $R^8$ and $R^9$ may be the same or different, and represent a hydrogen atom, an alkyl group, a substituted alkyl group, an alkenyl group, a substituted alkenyl group, an aryl group, a substituted aryl group, an aralkyl group or a substituted aralkyl group. $R^8$ and $R^9$ may form a 5-membered or 6-membered ring together with a nitrogen atom.

n is 1 or 2. When the above-described formula (5) does not have —SO$_3$H, it has at least two substituents selected from —COSH and —COOH.

The above-described color ink contains at least one or more water-soluble coloring materials selected from cyan, magenta and yellow, water, and a water-soluble organic solvent.

In the above-described color ink, only one of the cyan, magenta and yellow as the water-soluble coloring material, or two or more of them may be used, and when all of them are used in combination with the above-described black ink, a multicolor ink set for full color can be obtained.

Water-soluble coloring material

In the above-described color ink, it is necessary that 50% by weight or more of the above-described water-soluble coloring material has a solubility in water at 20° C. of 10% by weight or less.

Such a water-soluble coloring material having a solubility in water at 20° C. of 10% by weight or less, for example, can be suitably selected from the following dyes and the like.

As the cyan, it is preferable to select at least one of phthalocyanine compounds represented by the formula (A) and phthalocyanine compounds represented by the formula (B).

As the magenta, it is preferable to select at least one of compounds represented by the formula (C).

As the yellow, it is preferable to select at least one of C.I. Direct Yellow 144, C.I. Direct Yellow 86 and compounds represented by the following general formula (D).

In the above-described (A), Pc represents, for example, a phthalocyanine nucleus containing metal such as copper, titanium and the like. $R^1$, $R^2$ and $R^3$ may be the same or different, and represent each independently a hydrogen atom, an alkyl group such as a methyl group, ethyl group and the like, or a substituted alkyl group. As the above-described substituent, for example, —C$_2$H$_4$OH, —CH$_2$COOH and the like are listed. L represents a divalent organic connecting group such as an alkylene group and so on like a methylene group, ethylene group and the like. G represents a colorless organic group substituted by at least one substituent selected from —COSH and —COOH. t+q is 3 to 4. X represents a carbonyl group, a group represented by the following formula (a), a group represented by the following formula (b), or a substituent represented by the following formula (c). In the above-described chemical formula 8, Z represents —NR$^4$R$^5$, —SR$^6$ or —OR$^6$. Y represents a hydrogen atom, Cl, a zinc atom, —SR$^7$ or —OR$^7$. E represents Cl or —CN. R$^4$, R$^5$, R$^6$ and R$^7$ represent a hydrogen atom, an alkyl group such as a methyl group, ethyl group and the like or a substituted alkyl group. As the above-described substituent, for example, —C$_2$H$_4$OH, —CH$_2$COOH and the like are listed.

In the above-described general formula (B) shown in the chemical formula 9, Pc represents a phthalocyanine nucleus containing metal such as copper, titanium and the like, for example. R$^1$ represents a hydrogen atom, an alkyl group such as methyl, ethyl and the like, a substituted alkyl group, an alkenyl group, a substituted alkenyl group, an aralkyl group or a substituted aralkyl group. R$^2$ represents a hydrogen atom, a alkyl group, an alkoxy group, a halogen group, an amino group or a substituted amino group. t+q is 3 to 4. The general formula (B) has groups selected from —COSH and —COOH in a number equal to or more than that of —SO$_3$H, or in a number equal to that up to 5.

In the above-described general formula (C), J represents a divalent substituent represented by the above-described formula shown in the chemical formula 3. Ar$^1$ and Ar$^2$ may be the same or different, and represent an aryl group such as a benzyl group and the like or a substituent aryl group. As the above-described substituent, for example, —COOH and the like are listed. At least one of Ar$^1$ and Ar$^2$ has at least one substituent selected from —COSH and —COOH. R$^1$ and R$^2$ may be the same or different, and represent a hydrogen atom, alkyl group such as methyl, ethyl and the like, substituted alkyl group, alkenyl group or substituted alkenyl group. L represents a divalent organic connecting group such as an arylene group and so on like a phenylene group and the like. n is 0 or 1. X represents a carbonyl group, a group represented by the following formula (1), a group represented by the following formula (2) or a group represented by the following formula (3). In the above-described chemical formula 11, Z represents —NR$^3$R$^4$, —SR$^5$ or —OR$^5$. Y represents a hydrogen atom, Cl, a zinc atom, —SR$^6$ or —OR$^6$. E represents Cl or —CN. R$^3$, R$^4$, R$^5$ and R$^6$ may be the same or different, and represent a hydrogen atom, an alkyl group such as methyl, ethyl and the like, a substituted alkyl group, an alkenyl group, a substituted alkenyl group, an aralkyl group or a substituted aralkyl group. R$^3$ and R$^4$ may form a 5-membered or 6-membered ring together with a nitrogen atom.

In the above-described general formula (D) in the chemical formula 12, Ar$^1$ and Ar$^2$ may be the same or different, and represent an aryl group such as a benzyl group and the like or a substituent aryl group. At least one of Ar$^1$ and Ar$^2$ has at least one substituent selected from —COSH and —COOH. J$^1$ and J$^2$ may be the same or different, and represent a substituent represented by the formula (1), a substituent represented by the formula (2) or a substituent represented by the formula (3). In the above-described chemical formula 13, R$^5$ represents a substituent selected from a hydrogen atom, an alkyl group such as methyl, ethyl and the like, a substituted alkyl group, an alkoxyhalogen group, —CN, a ureide group and —NHCOR$^6$. R$^6$ represents a hydrogen atom, an alkyl group such as methyl, ethyl and the like, a substituted alkyl group, an aryl group such as benzyl and the like, a substituted aryl group, an aralkyl group or a substituted aralkyl group. T represents an alkyl group such as methyl, ethyl and the like. W represents a hydrogen atom, —CN, —CONR$^{10}$R$^{11}$, a pyridinium group or —COOH. m represents an alkylene chain having 2 to 8 carbon atoms. B represents a hydrogen atom, an alkyl group such as methyl, ethyl and the like, or —COOH.

R$^1$, R$^2$, R$^3$, R$^4$, R$^{10}$ and R$^{11}$ may be the same or different, and represent a hydrogen atom, a alkyl group such as methyl, ethyl and the like, or a substituted alkyl group. L represents a divalent organic connecting group such as an arylene group and so on like a phenylene group and the like. X represents a carbonyl group, a substituent represented by the formula (4), a substituent represented by formula (5) or a substituent represented by the formula (6). In the above-described chemical formula 14, Z represents —OR$^7$, —SR$^7$ or —NR$^8$R$^9$. Y represents a hydrogen atom, Cl or —CN. E represents Cl or —CN. R$^7$, R$^8$ and R$^9$ may be the same or different, and represent a hydrogen atom, alkyl group such as methyl, ethyl and the like, substituted alkyl group, alkenyl group, substituted alkenyl group, aryl group such as benzyl and the like, substituted aryl group, aralkyl group or substituted aralkyl group. R$^8$ and R$^9$ may form a 5-membered or 6-membered ring together with a nitrogen atom.

n is 1 or 2, and preferably 1. When the above-described formula (5) does not have —SO$_3$H, it has at least two substituents selected from —COSH and —COOH.

Specific examples of the phthalocyanine represented by the general formula (A) include compounds described below. The present invention is not limited to these specific examples. In the present invention, among the phthalocyanines represented by the formula (A), compounds as listed in the following specific examples (A-1 to 20) are preferable, and those used in examples described later are particularly preferable.

Formula (A-1)

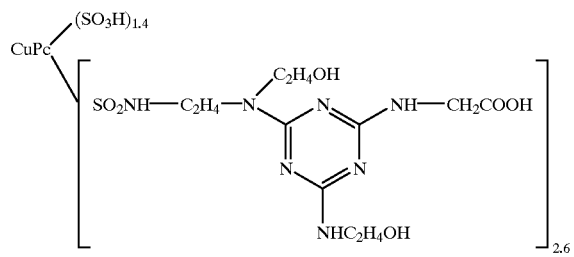

-continued
Formula (A-2)
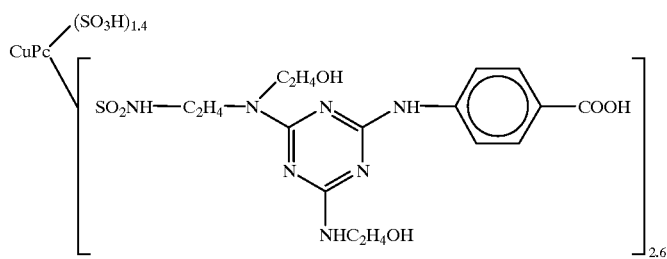
Formula (A-3)
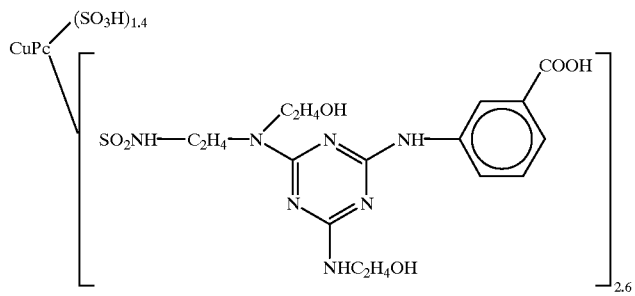
Formula (A-4)
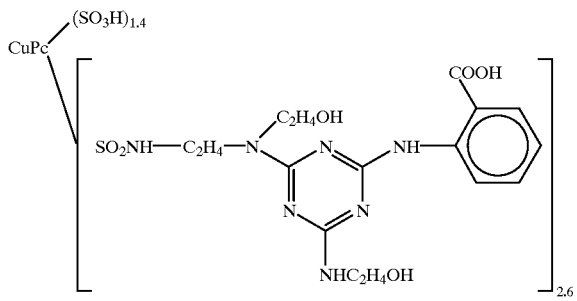
Formula (A-5)
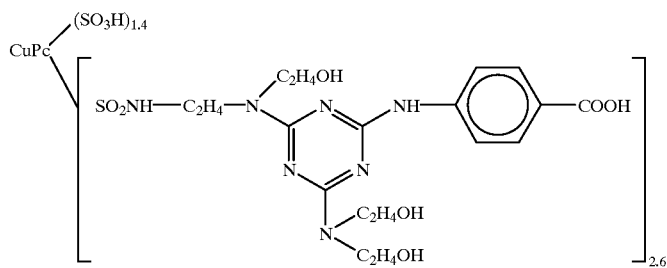
Formula (A-6)
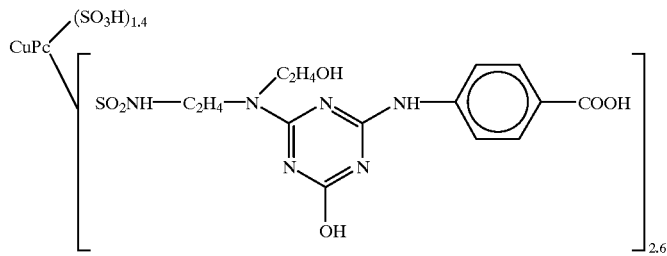

Formula (A-7)
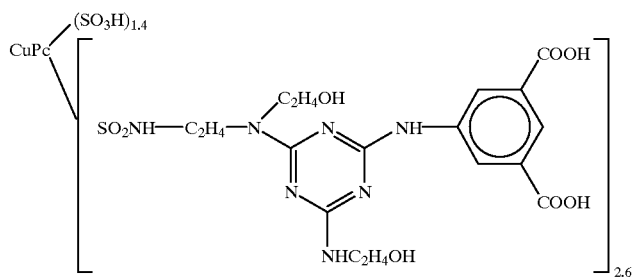
Formula (A-8)
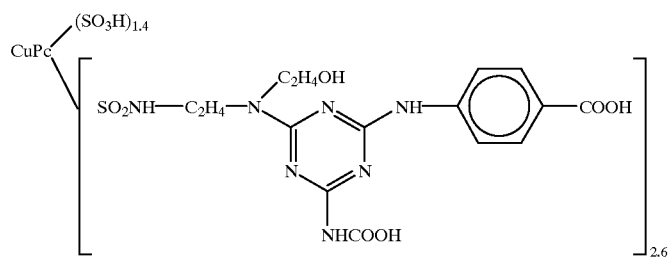
Formula (A-9)
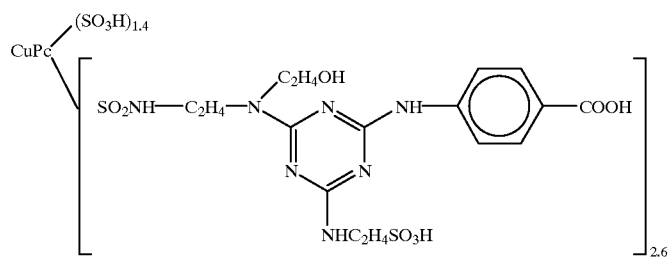
Formula (A-10)
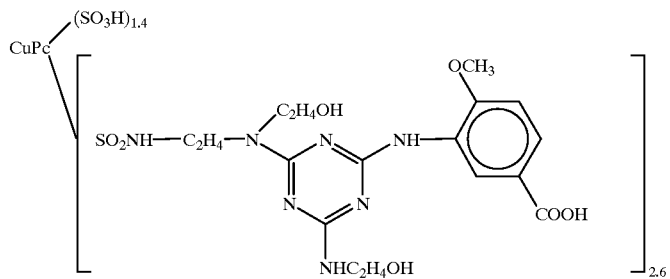
Formula (A-11)
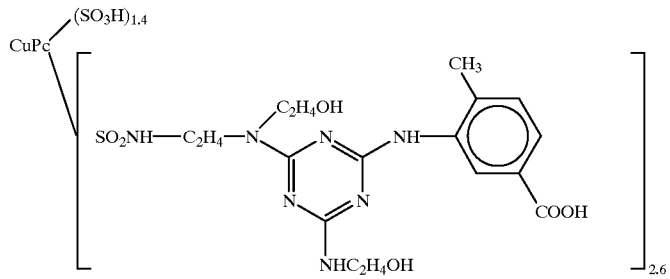

-continued
Formula (A-12)
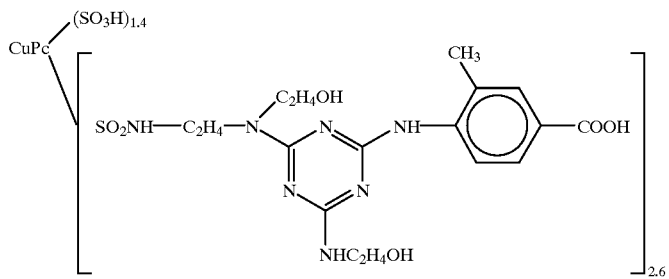
Formula (A-13)
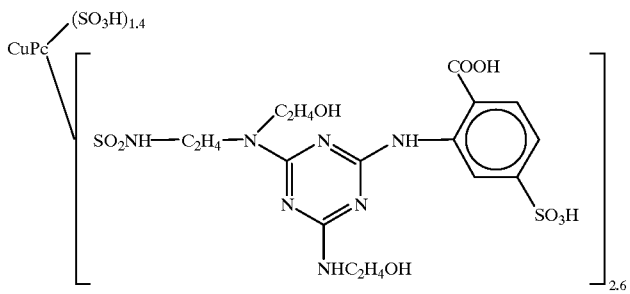
Formula (A-14)
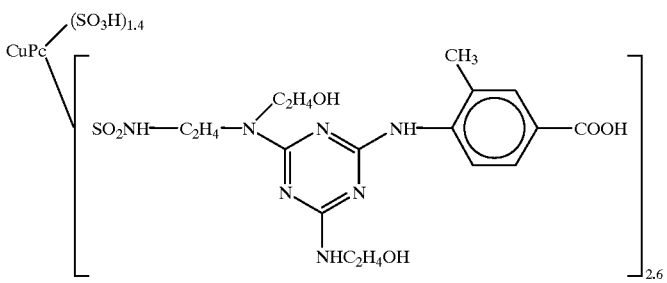
Formula (A-15)
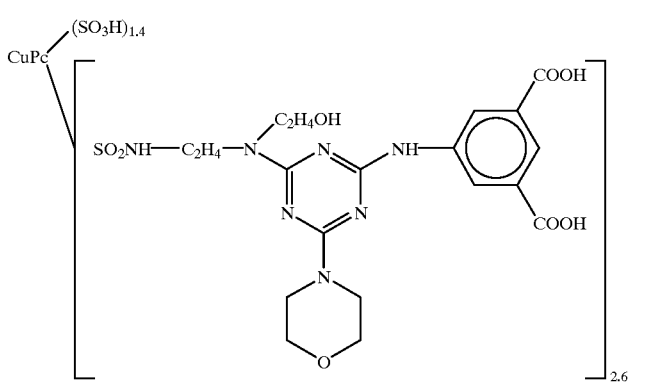

Formula (A-16)
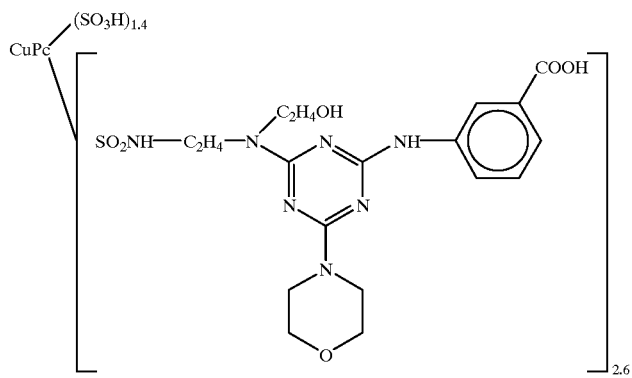
Formula (A-17)
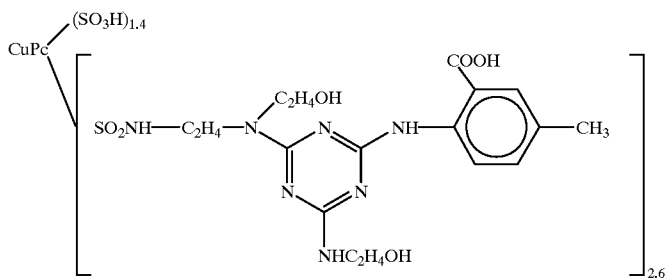
Formula (A-18)
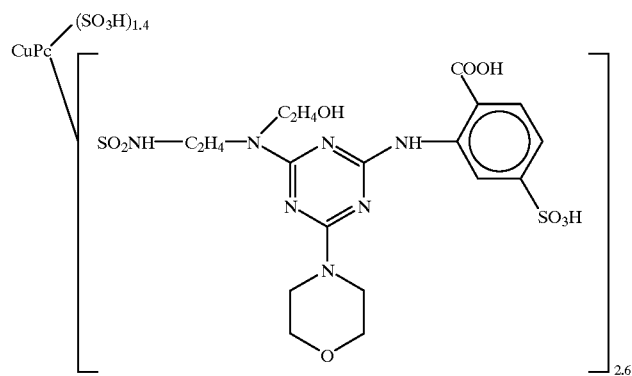
Formula (A-19)
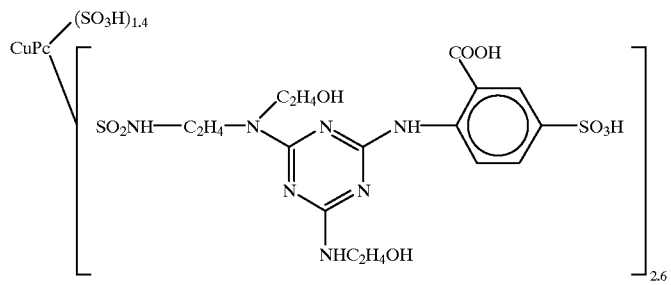

Formula (A-20)

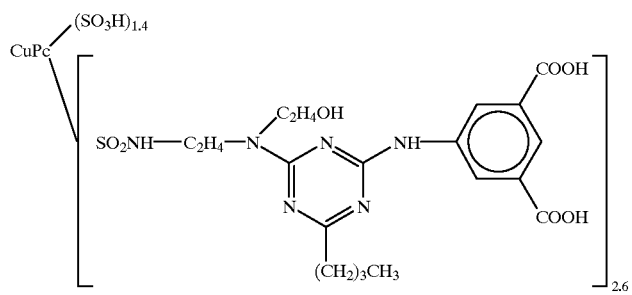

Specific examples of the phthalocyanine represented by the general formula (B) include compounds described below. The present invention is not limited to these specific examples. In the present invention, among the phthalocyanines represented by the formula (B), compounds as listed in the following specific examples (B-1 to 6) are preferable, and those used in examples described later are particularly preferable.

Formula (B-1)

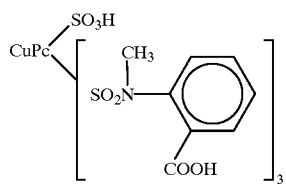

Formula (B-2)

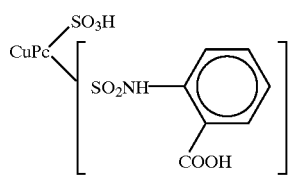

Formula (B-3)

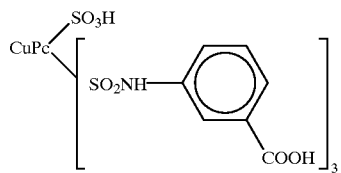

Formula (B-4)

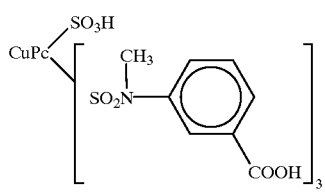

Formula (B-5)

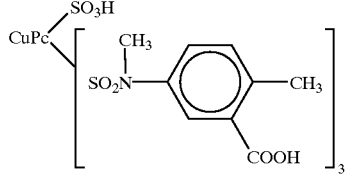

Formula (B-6)

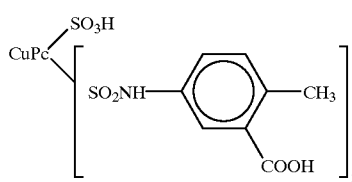

Specific examples of the magenta represented by the general formula (C) include compounds described below. The present invention is not limited to these specific examples. In the present invention, among the magentas represented by the formula (C), compounds as listed in the following specific examples (C-1 to 15) are preferable, and those used in examples described later are particularly preferable.

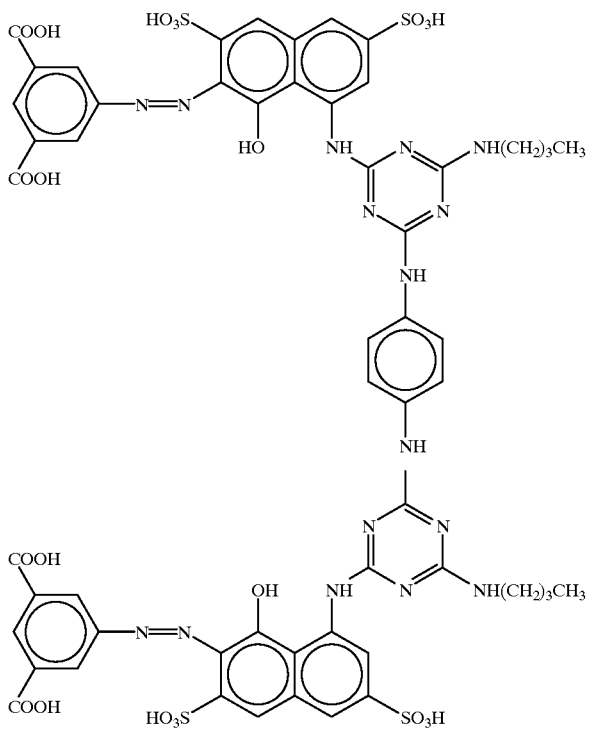
Formula (C-1)
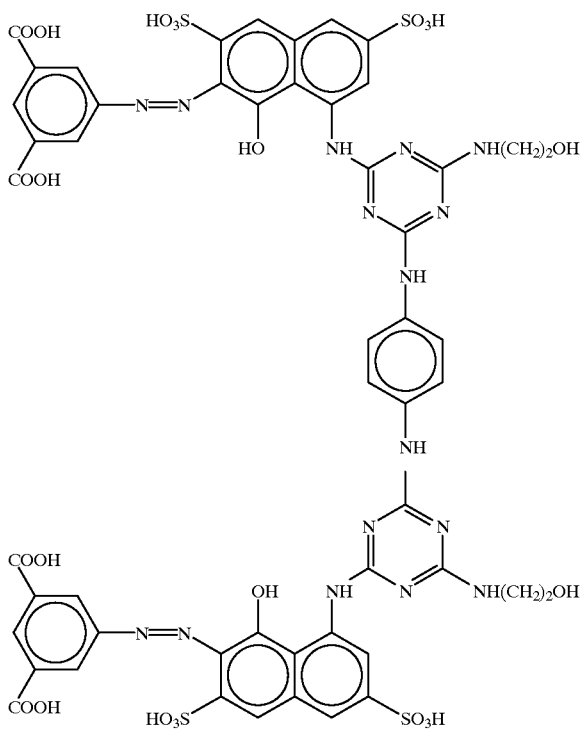
Formula (C-2)

-continued
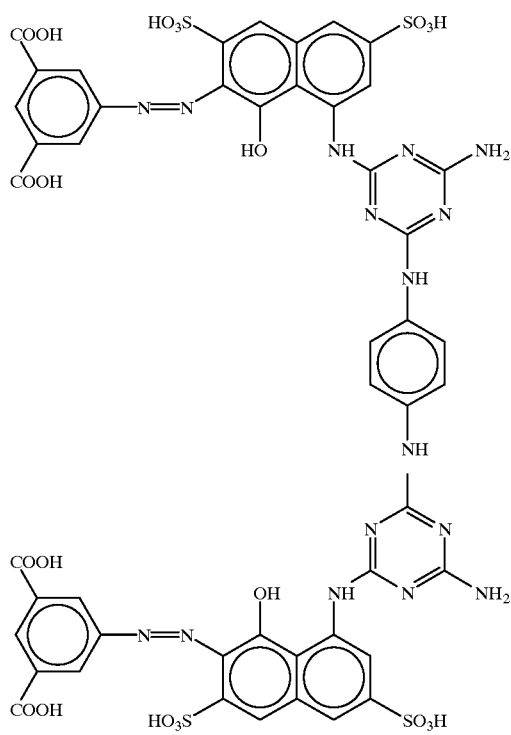
Formula (C-3)
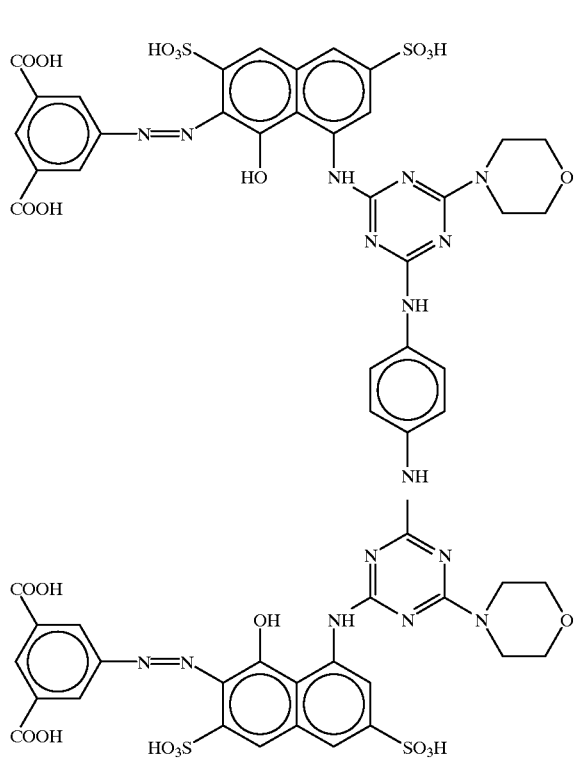
Formula (C-4)

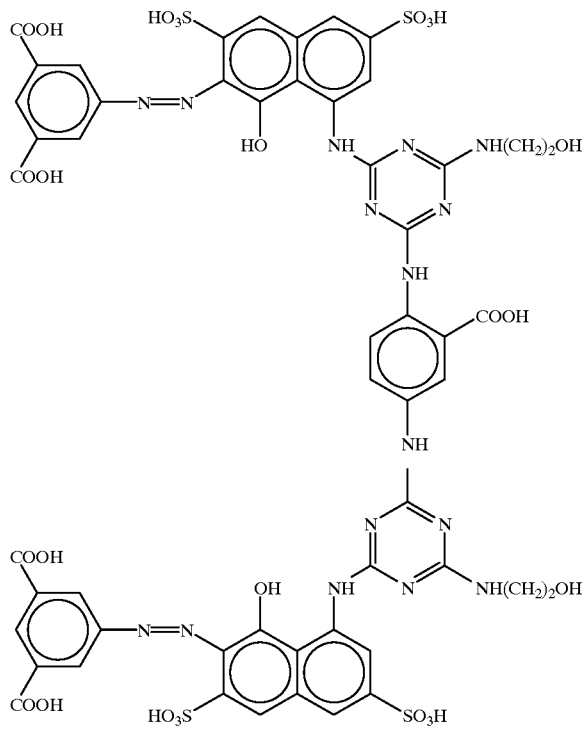
Formula (C-5)
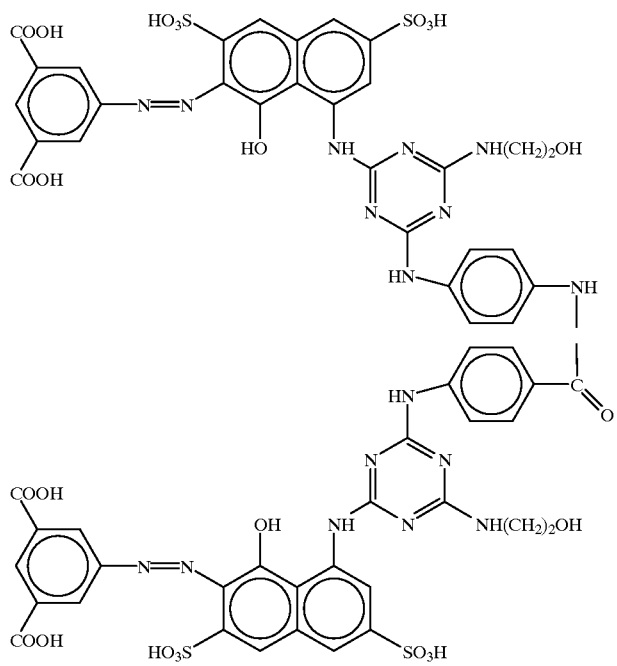
Formula (C-6)

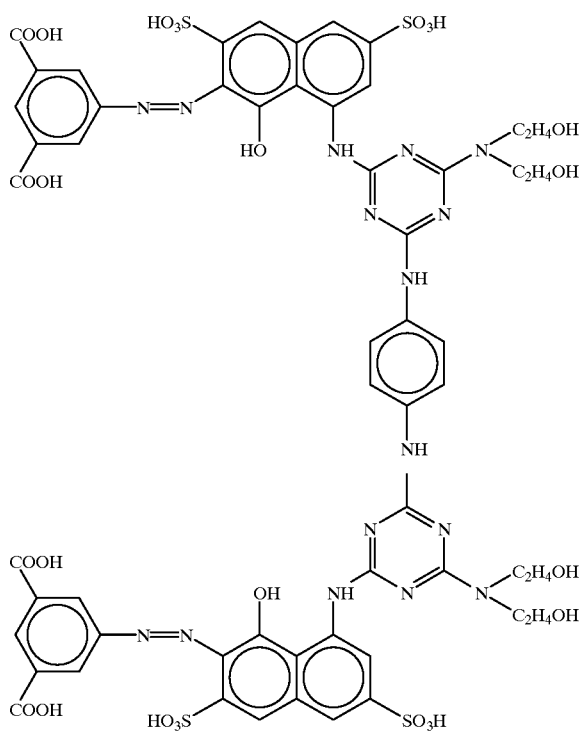
Formula (C-7)
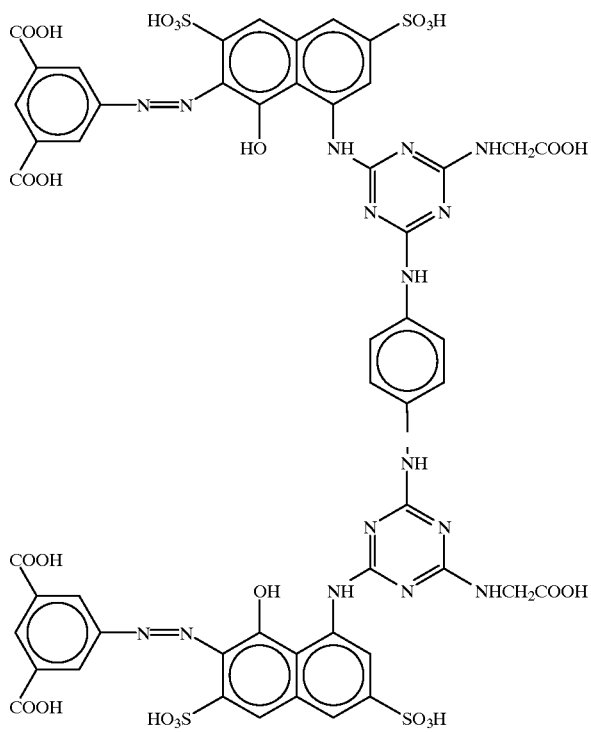
Formula (C-8)

-continued
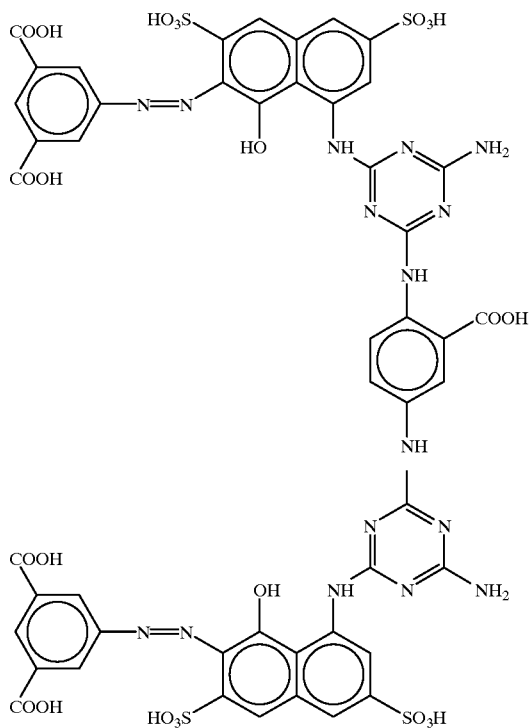
Formula (C-9)
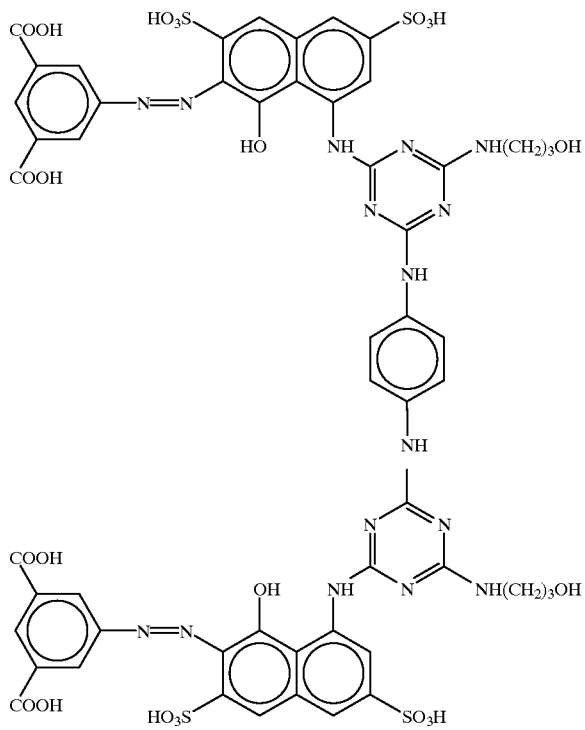
Formula (C-10)

-continued
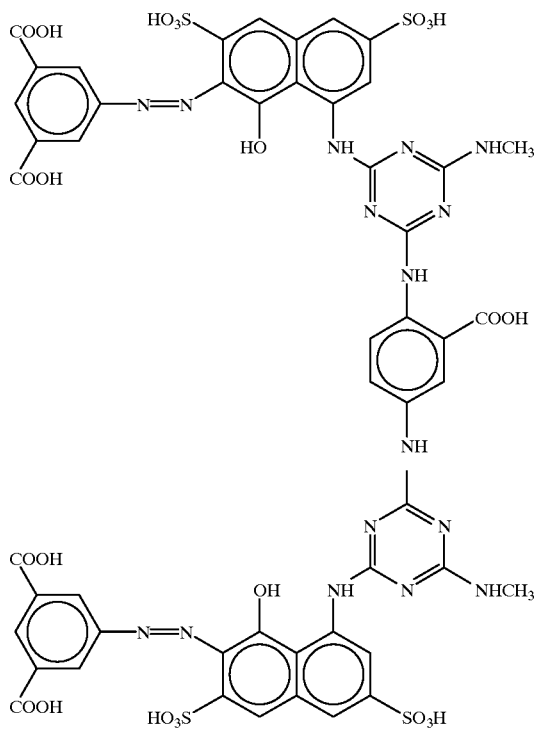
Formula (C-11)
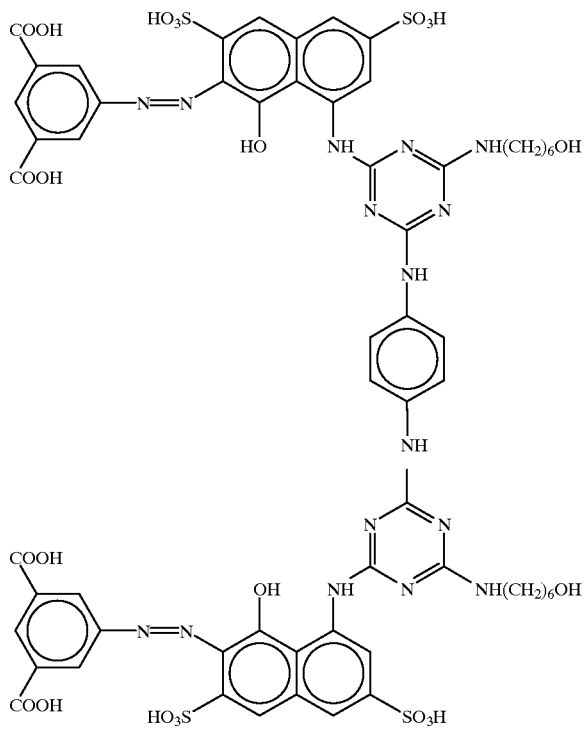
Formula (C-12)

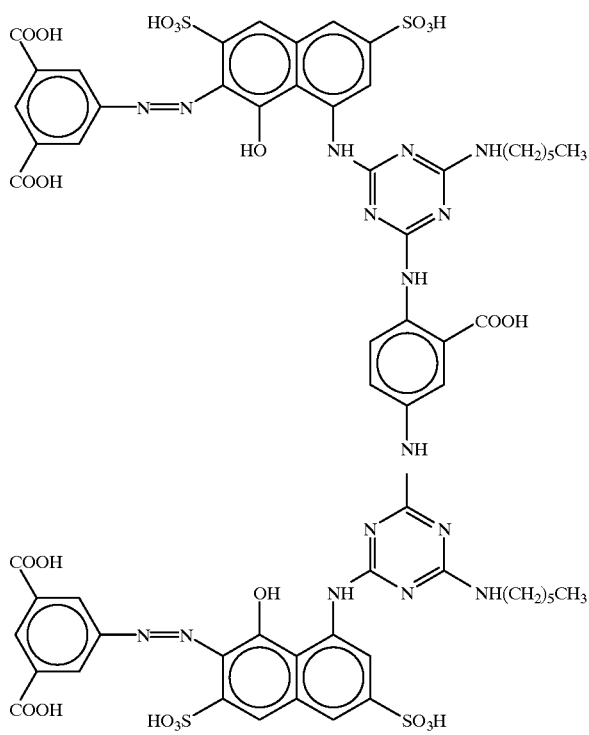
Formula (C-13)
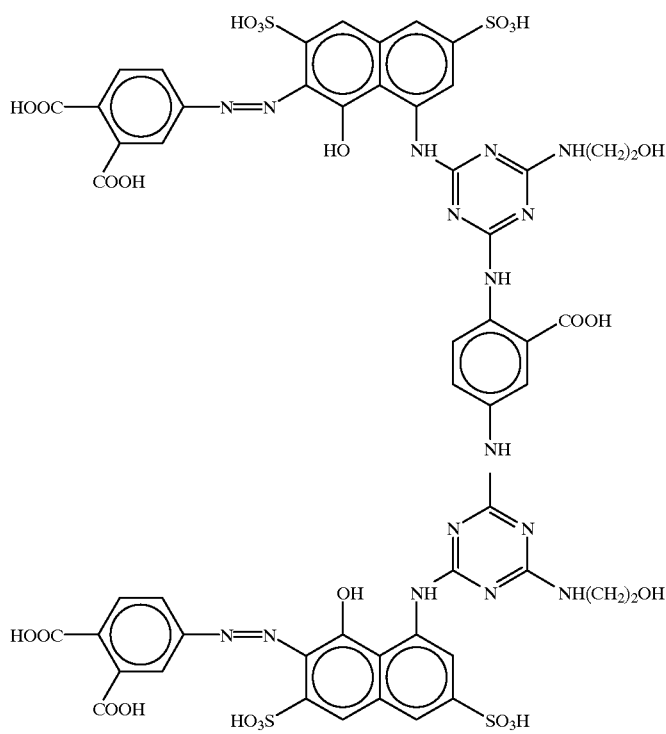
Formula (C-14)

-continued

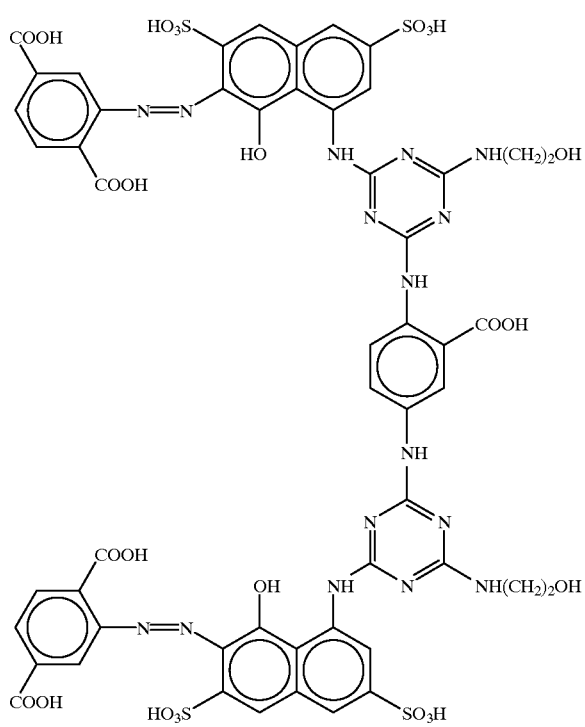

Formula (C-15)

Specific examples of the yellow represented by the general formula (D) include compounds described below. The present invention is not limited to these specific examples. In the present invention, among the yellows represented by the formula (D), compounds as listed in the following specific examples (D-1 to 30) are preferable, and those used in examples described later are particularly preferable.

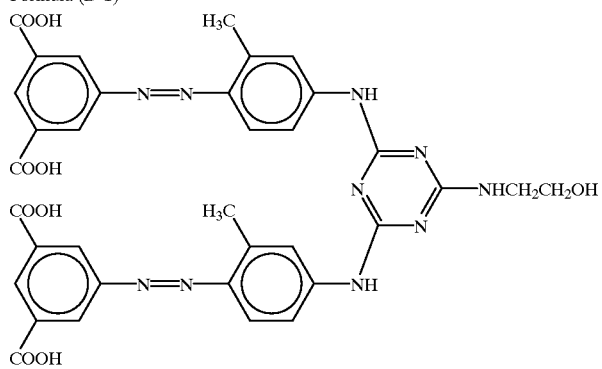

Formula (D-1)

-continued
Formula (D-2)
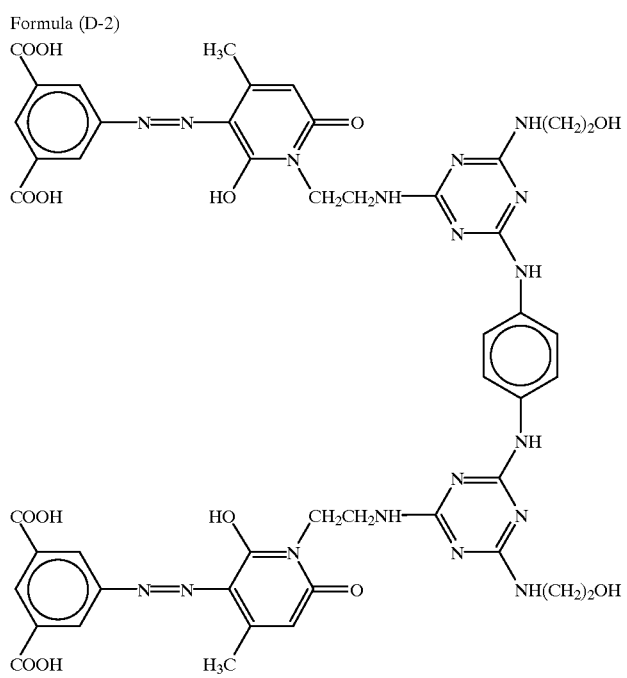
Formula (D-3)
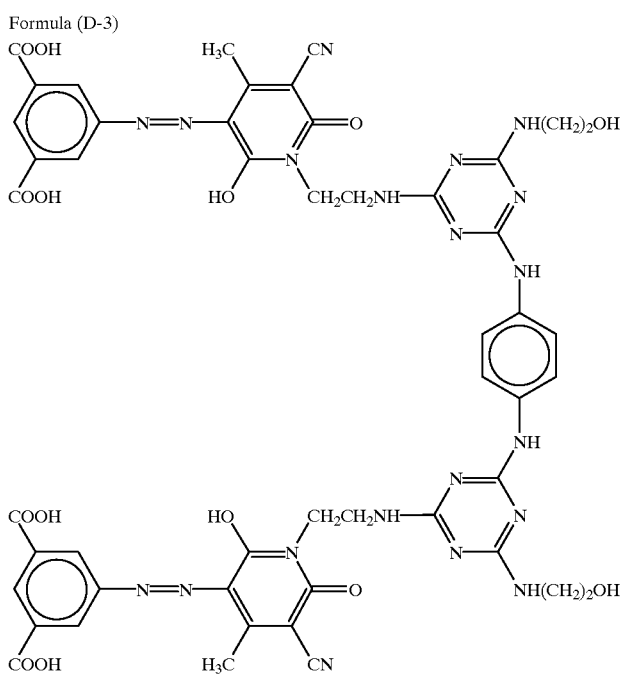

-continued
Formula (D-4)
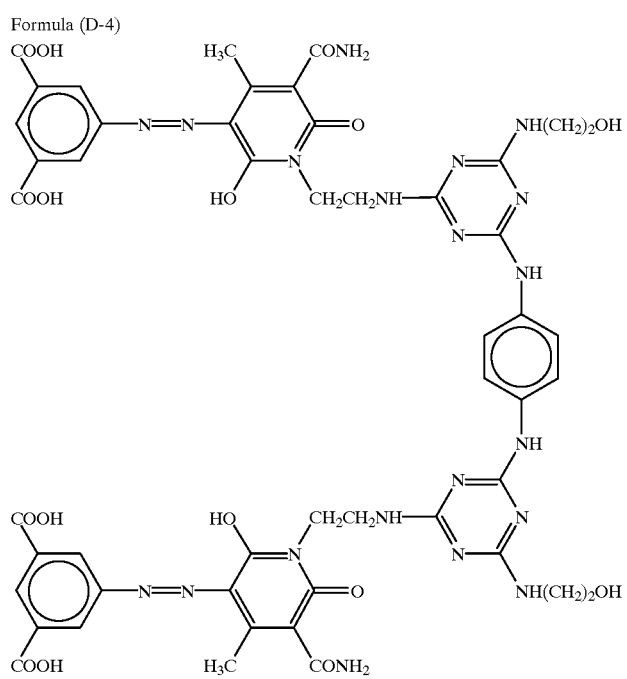
Formula (D-5)
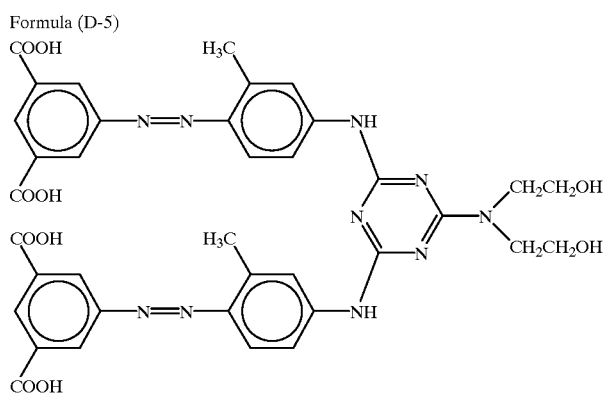
Formula (D-6)
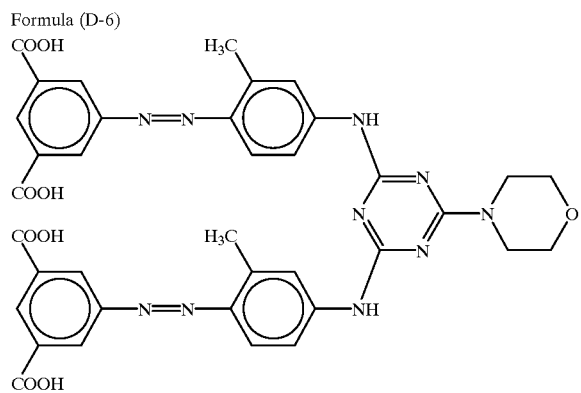

Formula (D-7)
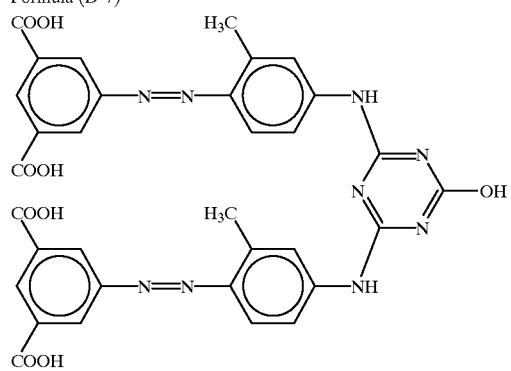
Formula (D-8)
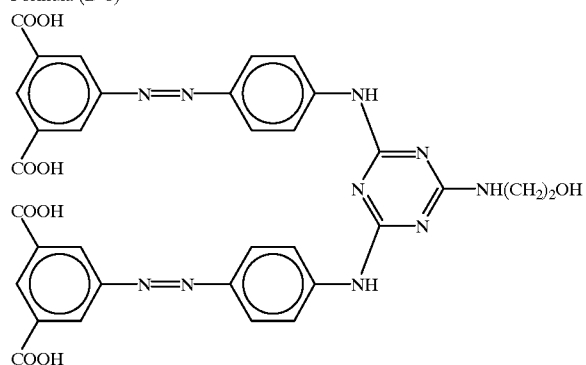
Formula (D-9)
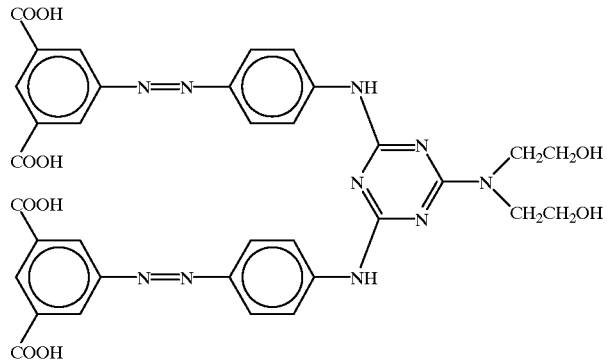
Formula (D-10)
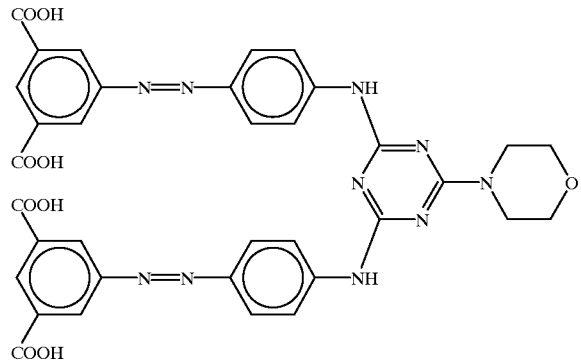

-continued
Formula (D-11)
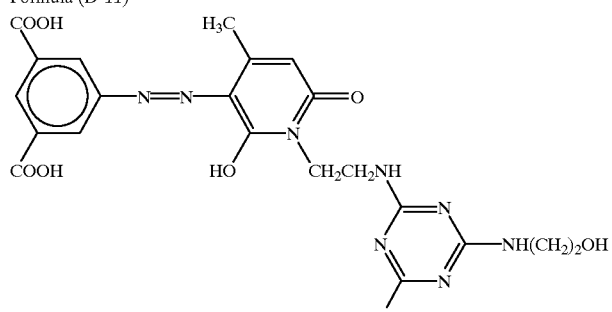
Formula (D-12)
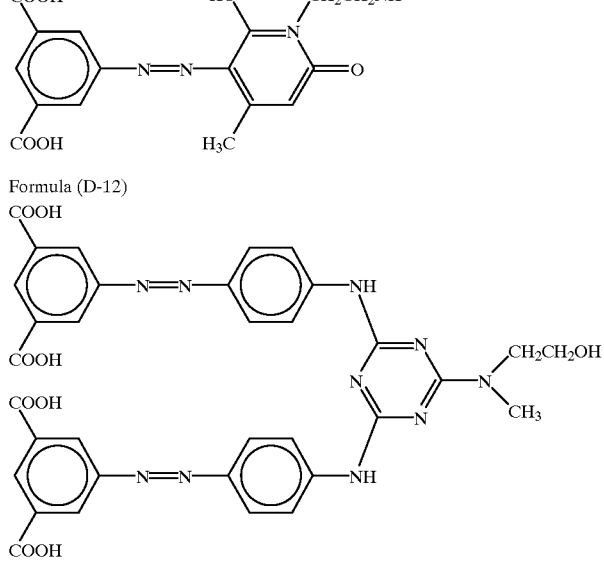
Formula (D-13)
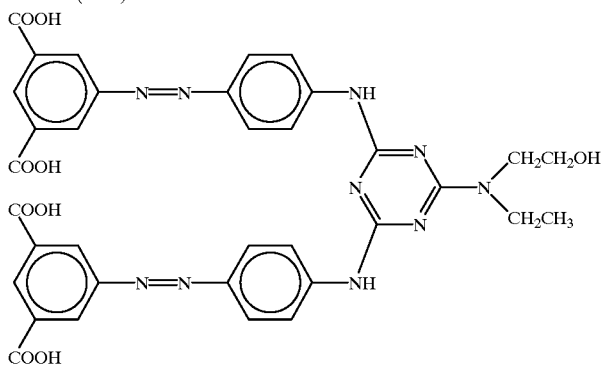
Formula (D-14)
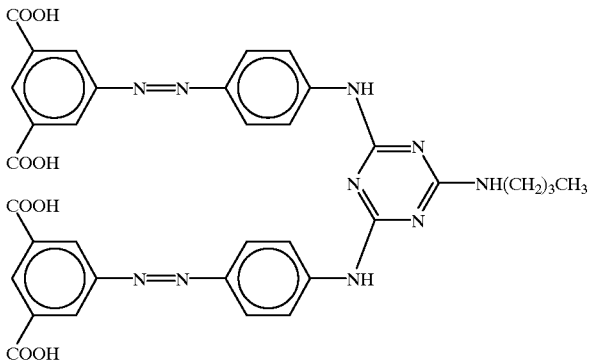

-continued
Formula (D-15)
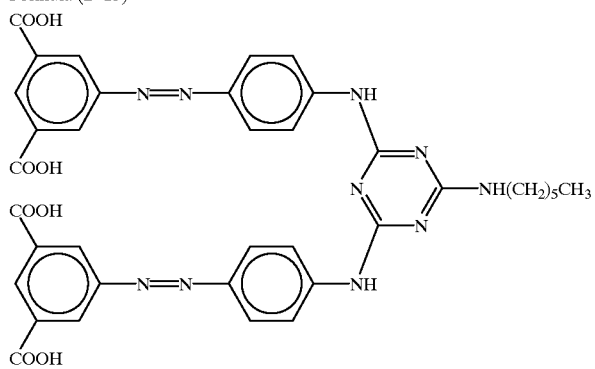
Formula (D-16)
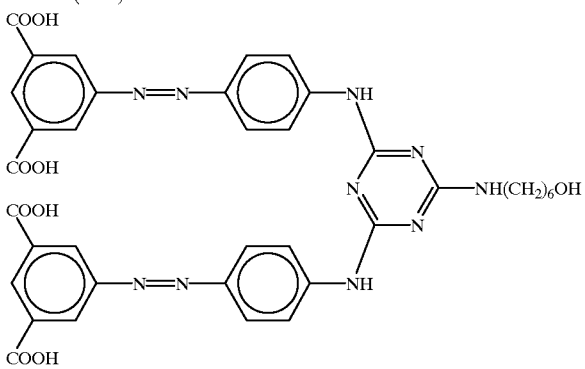
Formula (D-17)
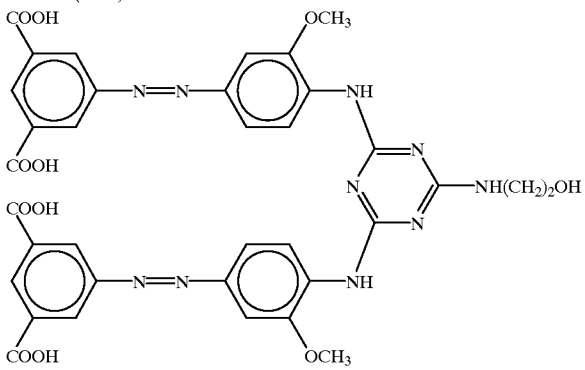
Formula (D-18)
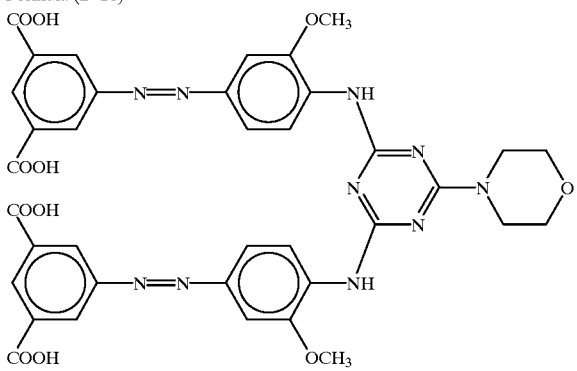

Formula (D-19)
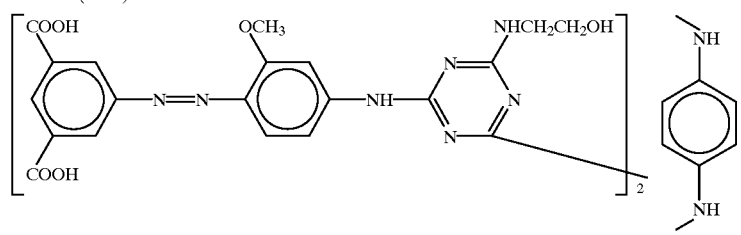
Formula (D-20)
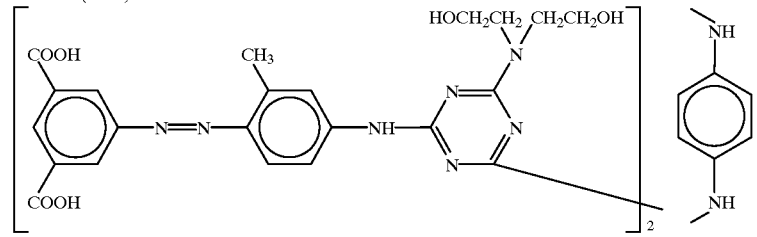
Formula (D-21)
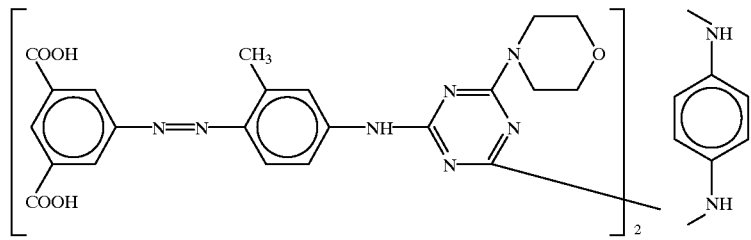
Formula (D-22)
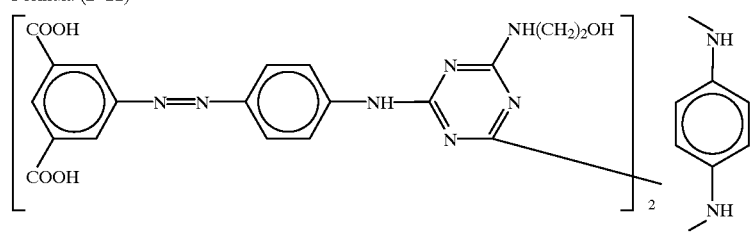
Formula (D-23)
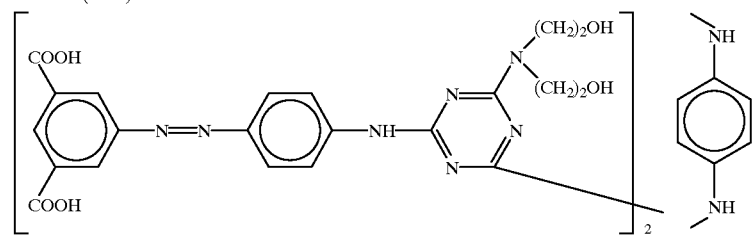

-continued
Formula (D-24)
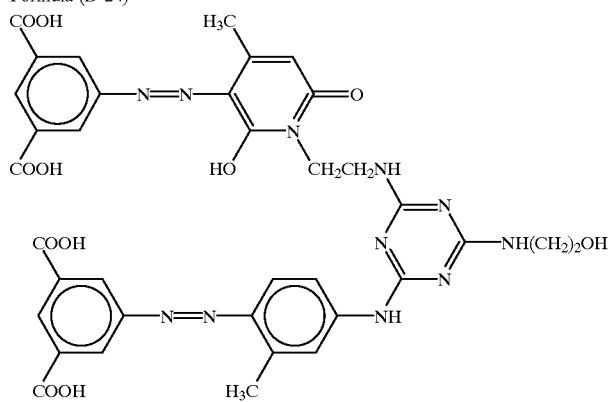
Formula (D-25)
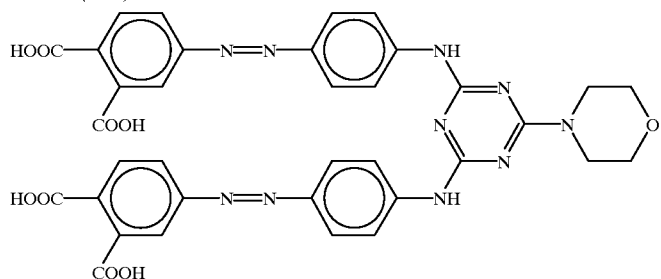
Formula (D-26)
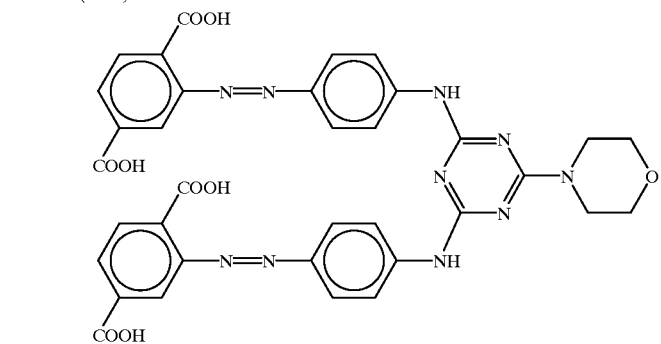
Formula (D-27)
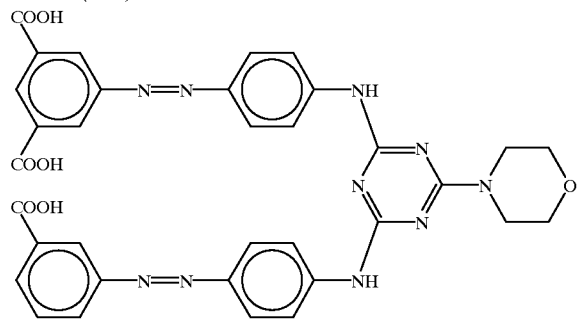

Formula (D-28)

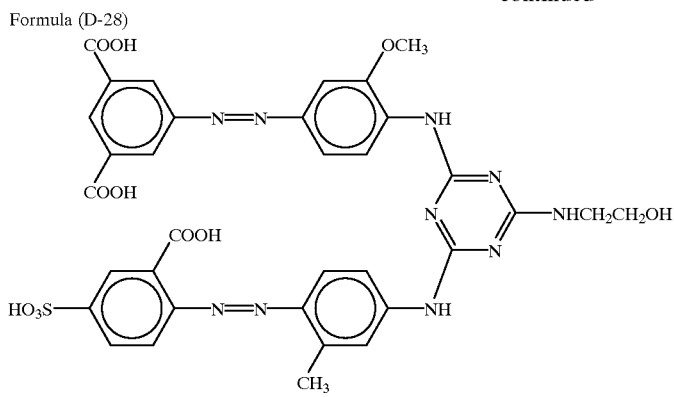

Formula (D-29)

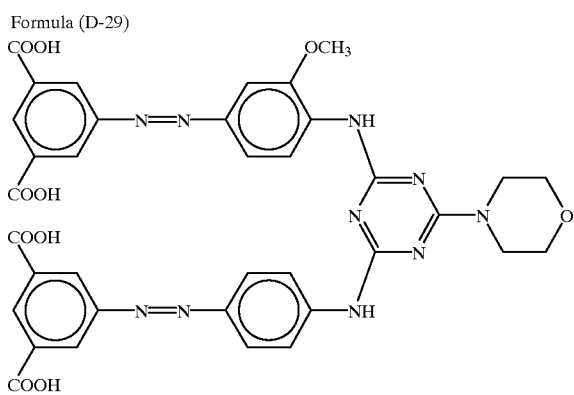

Formula (D-30)

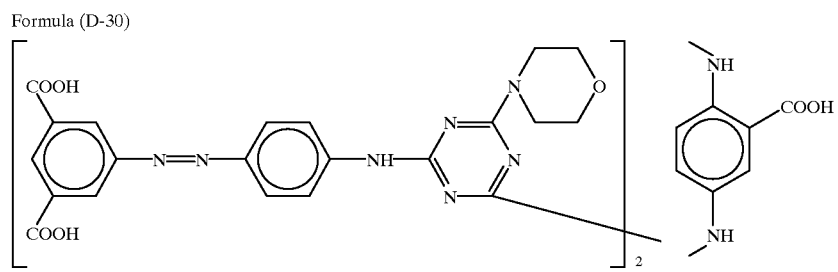

The above-described cyan, magenta and yellow may be used alone or in combinations of two or more, respectively, and in view of color reproducibility on normal paper, it is preferable that two or more dyes are used together in the case of the cyan and magenta, in particular.

Examples of the cyan dyes used together include C. I. Direct Blue-1, -2, -6, -8, -22, -34, -70, -71, -76, -78, -86, -112, -142, -165, -199, -200, -201, -202, -203, -207, -218, -236 and -287, C.I. Acid Blue-1, -7, -9, -15, -22, -23, -27, -29, -40, -43, -55, -59, -62, -78, -80, -81, -83, -90, -102, -104, -111, -185, -249 and -254, and the like. Among them, C.I. Direct Blue-86 and -199, C.I. Acid Blue-9 are particularly preferable.

Examples of the magenta dyes used together include C.I. Direct Red-1, -2, -4, -8, -9, -11, -13, -15, -20, -28, -31, -33, -37, -39, -51, -59, -62, -63, -73, -75, -80, -81; -83, -87, -90, -94, -95, -99, -101, -110, -189 and -227, C.I. Acid Red-1, -4, -8, -13, -14, -15, -18, -21, -26, -35, -37, -52, -110, -144, -180 and -249, C.I. Reactive Red-180, compounds represented by the following general formula (E), and the like. Among them, C.I. Direct Red -227, C.I. Acid Red -52 and compounds represented by the following general formula (E) are particularly preferable.

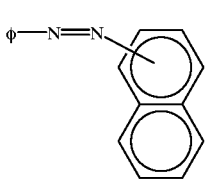

(E)

In the general formula (E), at least —OH or —SO₃ is introduced in the naphthyl group. Φ represents an unsubstituted or substituted phenyl group. The substituent on the substituted phenyl group represents an alkyl group, alkoxy group, amino group, nitro group, hydroxyl group, halogen group, formyl group, sulfonate group, cyclohexyl group which may be substituted, substituted sulfamoyl group, phenyl group which may be substituted, substituted amino group, substituted benzyloxy group, substituted phenylsulfonyl group, substituted carbamoyl group or substituted benzothiazolyl group.

Specific examples of the magenta represented by the general formula (E) include compounds described below. The present invention is not limited to these specific examples. In the present invention, among the magentas represented by the formula (E), compounds listed in the following specific examples (E-1 to 24) are preferable, and those used in examples described later are particularly preferable.
Formula (E-1)
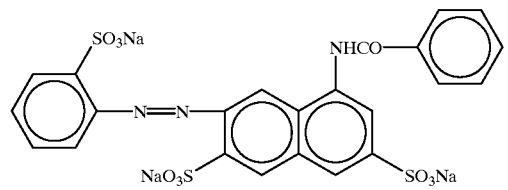
Formula (E-2)
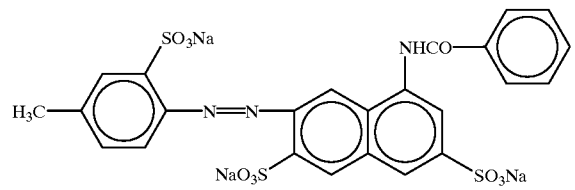
Formula (E-3)
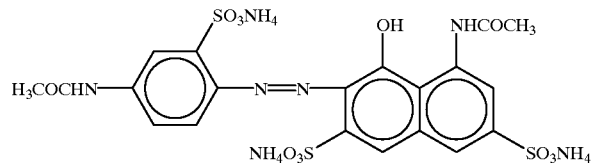
Formula (E-4)
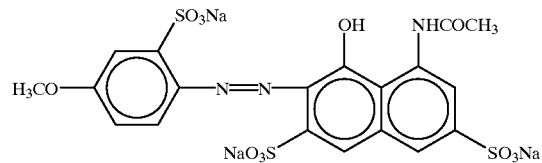
Formula (E-5)
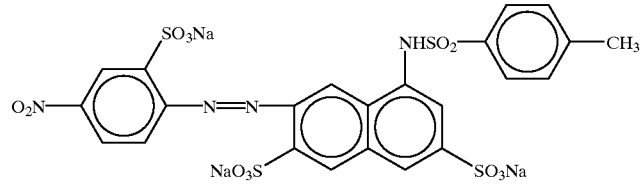
Formula (E-6)
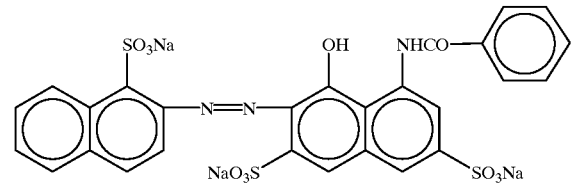
Formula (E-7)
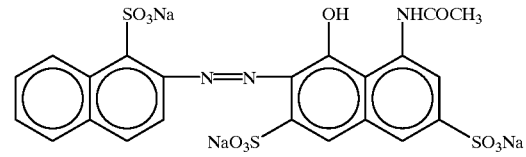

-continued
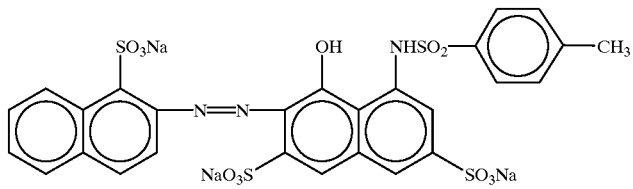
Formula (E-8)
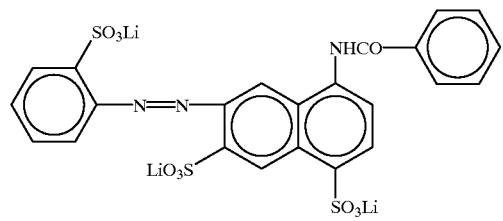
Formula (E-9)
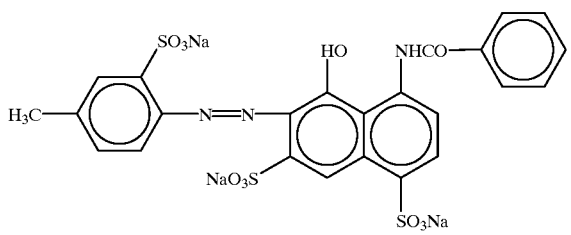
Formula (E-10)
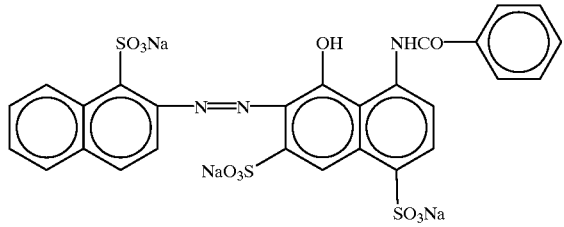
Formula (E-11)
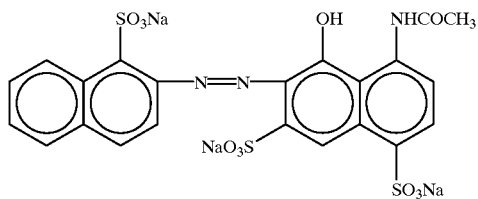
Formula (E-12)
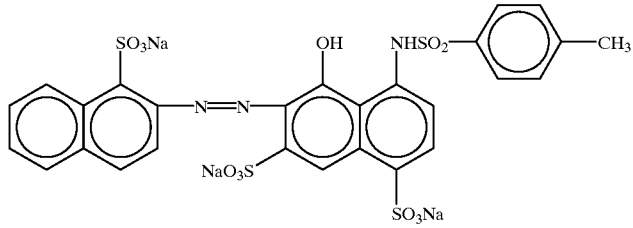
Formula (E-13)
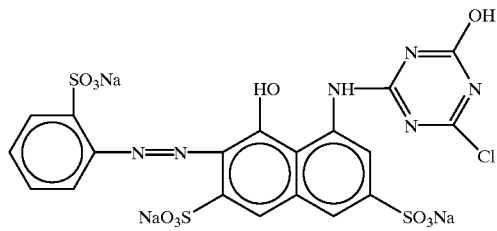
Formula (E-14)

-continued
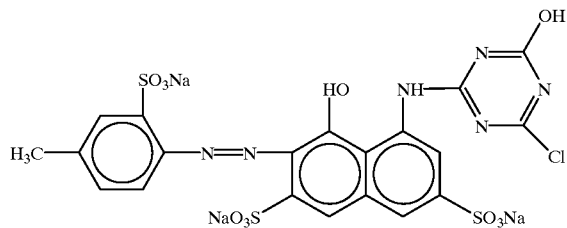
Formula (E-15)
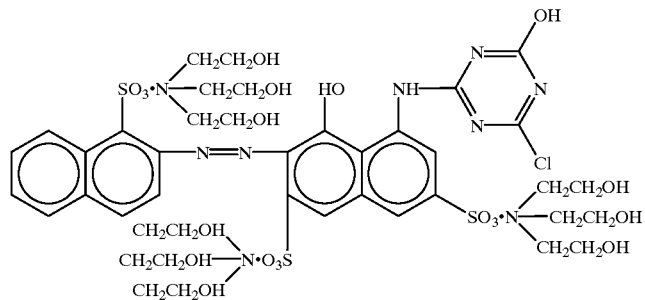
Formula (E-16)
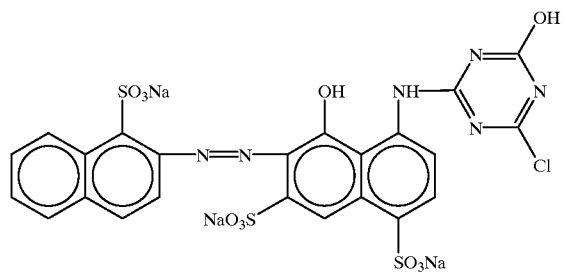
Formula (E-17)
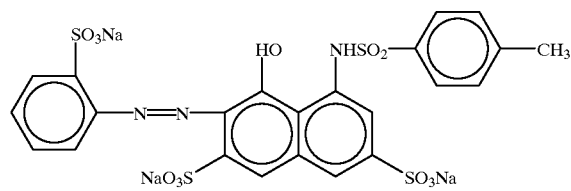
Formula (E-18)
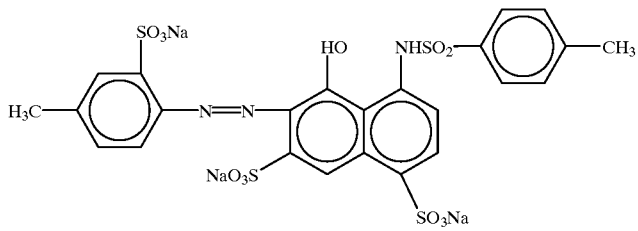
Formula (E-19)
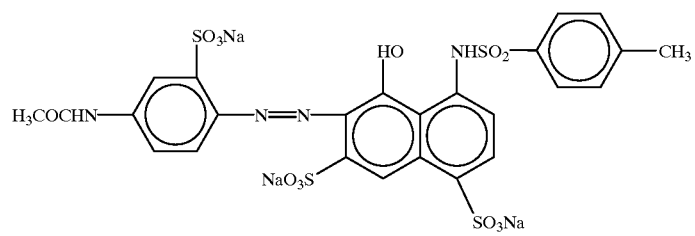
Formula (E-20)

-continued

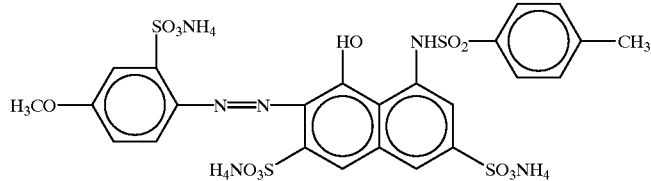

Formula (E-21)

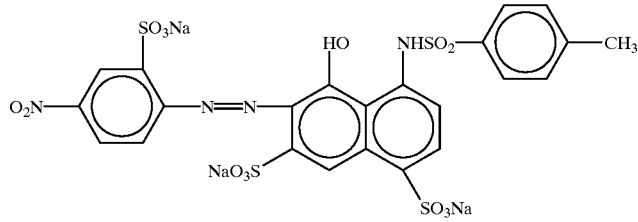

Formula (E-22)

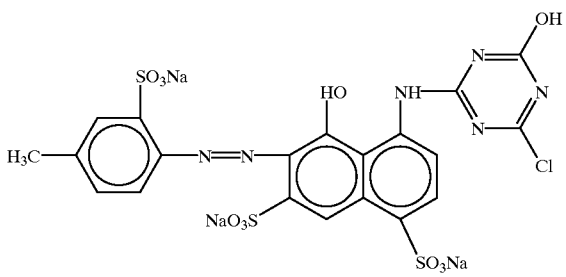

Formula (E-23)

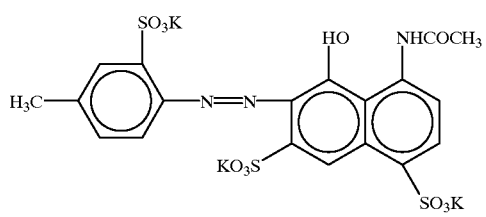

Formula (E-24)

As preferable combinations in which these respective dyes are used together in the present invention, for example, combinations adopted in examples described later are listed.

Water

As the water, those used in the black ink as described above are listed.

Water-soluble Organic Solvent

As the water-soluble organic solvent, those used in the black ink as described above are listed, and for attaining surface tension of a color ink as described below, it is preferable to use at least one water-soluble organic solvent having a surface tension less than 50 mN/m.

Examples of such a water-soluble organic solvents suitably include polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, polyoxyethylene polyoxypropylene monobutyl ether and the like, nitrogen-containing solvents such as pyrrolidone, N-methyl-2-pyrrolidone, cyclohexylpyrrolidone and the like, alcohols such as ethanol, isopropyl alocohol, butyl alcohol, benzyl alcohol and the like, sulfur-containing solvents such as sulfolane, dimethylsulfoxide and the like, propylene carbonate, ethylene carbonate, and the like.

Further, optionally, the surfactant, antioxidant, fungus proofing agent, electron conducting agent, antioxidant, ultra-violet ray absorbing agent, chelating agent, pH buffering agent, viscosity controlling agent and the like described above may be added into the color ink of the present invention.

In the present invention, the surface tension of the color ink at 20° C. is required to be 20 to 50 mN/m, and preferably from 25 to 45 mN/m, more preferably from 30 to 40 mN/m, and is also required to be lower than that of the black ink at 20° C. It is preferable that the surface tension of the color ink satisfies such conditions so that the coloration property of secondary colors such as blue, red, green and the like can be improved.

When the surface tension is less than 20 mN/m, color image blotting occurs, and stable discharge is not realized. On the other hand, when over 50 mN/m, blotting between colors can not be prevented.

Though control of the surface tension of the color ink can be conducted by using only the above-described surfactant, control may also be conducted through a water-soluble organic solvent having a surface tension of less than 50 mN/m as described above.

In the present invention, the content of each water-soluble coloring material: cyan, magenta or yellow in each color ink is usually from 0.1 to 8% by weight, preferably from 0.5 to 6% by weight.

On the other hand, conventionally, in an ink jet recording method in which black ink having a surface tension at 20° C. of from 30 to 60 mN/m and color ink having a surface tension at 20° C. of from 20 to 50 mN/m and lower than that of the black ink are used together, particularly on normal paper, gloss paper, OHP film, a significant and problematic phenomenon of the black images in color images bleeding into different color images is seen. However, in the case of the multicolor ink set of the present invention, such a problem is not observed, and further, there is no need to conduct special image control and heating of paper with a heater. In particular, if the concentration of the water-soluble coloring material in the color ink is controlled to 0.5 to 2.0% by weight and overprinting is conducted (so-called "photo mode") for the purpose of obtaining an image having quality corresponding to a photographic image, recording of a gradation image having extremely high quality can be easily conducted.

Namely, in the multicolor ink set of the present invention, blotting into an image having different color in a part in which a high volume of ink is printed per unit area in image parts adjacent to black ink can be greatly suppressed. In this case, order of colors to be printed is not particularly restricted, and the colors may be divided and printed.

The multicolor ink set of the present invention can be used for various objects in various fields, and very suitably, in an ink jet recording method. In addition, it can be used in a recording method using recording apparatus equipped with a heater for assisting fixation of ink on paper, a recording method using a recording apparatus equipped with an intermediate transferring mechanism, and the like.

[Ink Jet Recording Method]

The ink jet recording method of the present invention conducts recording by discharging ink drops through an orifice according to a recording signal. The discharged ink drops penetrate into a recording material such as paper and the like. The type of ink used is not particularly restricted providing it belongs to the multi ink set of the present invention. A known recording method can be adopted.

The above-described recording method is not particularly restricted, and a so-called electric charge controlling method in which ink is discharged by utilizing electrostatic attracting force, a so-called drop-on-demand method (pressure pulse method) in which ink is discharged by utilizing the vibrational pressure of a piezo-electric element, a so-called heating method in which ink drops are formed by utilizing pressure generated by heating the ink and forming and growing bubbles, and the like are listed.

In the present invention, among these methods, the heating method is preferable, and a heating method in which a head comprising a polyimide-based resin is used is particularly preferable. As the head comprising a polyimide resin, a recording head in which at least an ink channel is made from a polyimide resin is preferable. In this case, it is advantageous if the head has excellent heat resistance, enables precise processing, and is chemically stable in ink.

This recording head has a heat generating body to be heated itself, and heating of the heat generating body is conducted by the action (application) of a plurality of energy pulses from a controller and the like according to a recording signal.

The ink jet recording method of the present invention may suitably comprise, for example, a preliminary discharging process in which ink drops are preliminarily discharged for the purpose of preventing clogging when recording is not conducted, in addition to a recording process in which recording is conducted.

EXAMPLE

The following examples further illustrate the multicolor ink set and ink jet recording method of the present invention below. The present invention is in no way limited to these examples.

(Black Ink)

Preparation of Dispersion of Water-insoluble Coloring Material

Dispersions A, B, C, D and E of water-insoluble coloring materials having compositions respectively shown in Table 1 were prepared in the following order. First, components other than the water-insoluble coloring material were weighed in respective amounts, mixed and stirred. The water-insoluble coloring material was added gradually, and the whole stirred for 1 hour. Dispersions A and E were dispersed for 2 hour with an attritter (media: SUS, diameter; 3 mm). Dispersions C and D were passed through a microfluidizer (13 kpsi) 5 times. Dispersion B was dispersed for 1 hour with an ultrasonic homogenizer. Next, coarse particles were removed from each dispersion with a centrifuge.

Preparation of Black Ink

Respective components were mixed to obtain compositions shown in Table 2 respectively, then, the mixtures were treated for 30 minutes by using a ultrasonic homogenizer, filtered under pressure through a membrane filter having a pore size of 1 $\mu$m, to prepare black inks 1 to 7, respectively.

TABLE 1

| Dispersion | Pigment | Dispersing agent | Water |
|---|---|---|---|
| Dispersion A | Carbon black 10 parts by weight (Raven 5250, primary particle size 16 nm, manufactured by Columbia Corp.) | Styrene-potassium maleate block polymer 5.0 parts by weight (average molecular weight 2000, styrene/maleic acid = 1/2, acid value 220) When dissolved, controlled to pH 8.4 with KOH | Ultrapure water 70 parts by weight |
| Dispersion B | Carbon black 15 parts by weight (Regal 330, primary particle size 25 nm, manufactured by Cabott Corp.) | Styrene/n-butyl methacrylate/ammonium methacrylate copolymer 3.0 parts by weight (average molecular weight 3000, styrene/n-butyl methacrylate/mathacrylic acid = 1/2/2, acid value 350) When dissolved, controlled to pH 8.2 with NaOH | Ultrapure water 70 parts by weight |

TABLE 1-continued

| Dispersion | Pigment | Dispersing agent | Water |
|---|---|---|---|
| Dispersion C | Carbon black 15 parts by weight (Black Pearl L, primary particle size 24 nm, manufactured by Cabott Corp.) | Styrene/methoxy triethylene glycol methacrylate/calcium methacrylate 3.0 parts by weight (average molecular weight 2000, styrene/methoxy triethylene glycol methacrylate/methacrylic acid 1/1/3, acid value 300) When dissolved, controlled to pH 8.5 with $NH_4OH$ | Ultrapure water 70 parts by weight |
| Dispersion D | Carbon black 15 parts by weight (No. 25B, primary particle size 40 nm, manufactured by Mitsubishi Chemical Co., Ltd.) | Styrene/calcium maleate block polymer 4.0 parts by weight (average molecular weight 2000, styrene/maleic acid = 1/2, acid value 220) When dissolved, controlled to pH 9.0 with NaOH | Ultrapure water 70 parts by weight |
| Dispersion E | Carbon black 15 parts by weight (Regal 330, primary particle size 25 nm, manufactured by Cabott Corp.) | Sodium polystyrenesulfonate polymer 4.2 parts by weight (average molecular weight 6500, sulfonation degree 90%) When dissolved, controlled to pH 8.5 with $NH_4OH$ | Ultrapure water 70 parts by weight |

TABLE 2

(parts by weight)

| | Dispersion | | Solvent | | Additive | | Water |
|---|---|---|---|---|---|---|---|
| Black ink 1 | Dispersion A | 50 | Diethylene glycol | 10 | Surfynol 465 | 0.05 | Ultrapure water |
| | | | Isopropyl alcohol | 3 | (manufactured by Nisshin Chemical Corp.) | | 36.95 |
| Black ink 2 | Dispersion B | 65 | Glyserin | 12 | Polyoxyethylene oleyl ether | 0.1 | Ultrapure water |
| | | | Thiodiethanol | 6 | Urea | 5 | 16.9 |
| | | | Polyoxyethylene diglyceryl ether | 5 | | | |
| Black ink 3 | Dispersion C | 55 | Ethylene glycol | 15 | Polysiloxane polyoxyethylene adduct | 0.2 | Ultrapure water |
| | | | Sulfolane | 10 | | | 19.8 |
| Black ink 4 | Dispersion C | 50 | Diethylene glycol | 10 | Florad FC-104 | 0.01 | Ultrapure water |
| | | | Sulfolane | 10 | (Three M Corp.) | | 21.99 |
| | | | | | Urea | 5 | |
| | | | | | Cyclodextrin | 3 | |
| Black ink 5 | Dispersion D | 50 | 2-Pyrrolidone | 15 | Urea | 5 | Ultrapure water |
| | | | Isopropyl alcohol | 3 | Ethyl acrylate/Ethy methacrylate/monoethanolamine salt of acrylic acid | 3.0 | 24 |
| Black ink 6 | Dispersion E | 50 | Diethylene glycol | 10 | Surfynol 465 | 0.05 | Ultrapure water |
| | | | Isopropyl alcohol | 3 | (manufactured by Nisshin Chemical Corp.) | | 36.95 |
| Black ink 7 | Dispersion A | 30 | Ethylene glycol | 15 | Pulronic 6400 | 0.5 | Ultrapure water |
| | | | Diethylene glycol monobutyl ether | 9 | (manufactured by BASF) | | 40.5 |
| | | | | | Urea | 5 | |
| Black ink 8 | Dispersion A | 50 | Sulfolane | 10 | Florad FC-104 | 1 | Ultrapure water |
| | | | | | (manufactured by Three M Corp.) | | 39 |
| Black ink 9 | Dispersion B | 50 | Glyserin | 10 | — | | Ultrapure water 40 |
| Black ink 10 | C.I. Food Black 2 | 3 | Diethylene glycol | 10 | Surfynol 465 | 0.05 | Ultrapure water |
| | | | Isopropyl alcohol | 3 | (manufactured by Nisshin Chemical Corp.) | | 83.95 |

(Color Ink)

Components in respective color inks were fully mixed and dissolved to respectively obtain compositions shown in Tables 3, 4 and 5, and the compositions were filtered under pressure through a 0.2 μm filter. Color ink sets composed of cyan, magenta and yellow colors were prepared.

TABLE 3

| Water-soluble coloring material (% by weight) | | Water-soluble organic solvent, other component (% by weight) | |
|---|---|---|---|
| Color ink set 1 | | | |
| Cyan | | | |
| Formula (A-24) (solution degree 5%) | 2.0 | Diethylene glycol | 12.0 |
| | | Diethylene glycol monobutyl ether | 5.0 |
| C.I. Acid Blue 9 (solubility 20% or more) | 0.2 | Surfinol 465 (manufactured by Nisshin Chemical Corp.) | 0.1 |
| | | Sodium hydroxide | 0.3 |
| | | N,N-bis(2-hydroxyethyl)-2-aminoethane sulfonic acid | 0.6 |
| | | Urea | 7.0 |
| | | Ultrapure water | 72.8 |
| Magenta | | | |
| Formula (C-2) (solution degree 6%) | 1.4 | Diethylene glycol | 11.0 |
| | | Diethylene glycol monobutyl ether | 6.0 |
| Formula (E-1) (solubility 20% or more) | 0.5 | Surfinol 465 (manufactured by Nisshin Chemical Corp.) | 0.1 |
| | | Sodium hydroxide | 0.3 |
| | | N,N-bis(2-hydroxyethyl)-2-aminoethane sulfonic acid | 0.6 |
| | | Urea | 6.0 |
| | | Ultrapure water | 74.1 |
| Yellow | | | |
| Formula (D-1) (solution degree 5%) | 2.0 | Diethylene glycol | 11.0 |
| | | Diethylene glycol monobutyl ether | 5.5 |
| C.I. Acid Yellow 23 (solubility 20% or more) | 1.0 | Pluronic PE 63 (manufactured by BASF Corp.) | 0.3 |
| | | Sodium hydroxide | 0.3 |
| | | N,N-bis(2-hydroxyethyl)-2-aminoethane sulfonic acid | 0.6 |
| | | Urea | 6.0 |
| | | Ultrapure water | 74.5 |
| Color ink set 2 | | | |
| Cyan | | | |
| Formula (A-24) (solubility 4%) | 2.0 | Sulfolane | 12.0 |
| | | Glyserin | 10.0 |
| C.I. Direct Blue 199 (solubility 15% or more) | 1.0 | Pluronic PE 63 (manufactured by BASF Corp.) | 0.6 |
| | | Sodium hydroxide | 0.3 |
| | | N,N-bis(2-hydroxyethyl)-2-aminoethane sulfonic acid | 0.6 |
| | | Urea | 6.0 |
| | | Benzoic acid | 0.3 |
| | | Ultrapure water | 67.2 |
| Magenta | | | |
| C.I. Direct Red 277 (solution degree 12%) | 0.2 | Sulfolane | 12.0 |
| | | Glyserin | 10.0 |
| Formula (C-5) (solubility 4%) | 2.2 | Pluronic PE 63 (manufactured by BASF Corp.) | 0.6 |
| | | Lithium hydroxide | 0.3 |
| | | N,N-bis(2-hydroxyethyl)-2-aminoethane sulfonic acid | 0.6 |
| | | Urea | 4.0 |
| | | Benzoic acid | 1.0 |
| | | Ultrapure water | 69.1 |
| Yellow | | | |
| C.I. Direct Yellow 144 | 1.5 | Sulfolane | 12.0 |
| C.I. Acid Yellow 23 (solubility 20% or more) | 0.2 | Glyserin | 5.0 |
| | | Thiodiethanol | 5.0 |
| | | Pluronic PE 63 (manufactued by BASF Corp.) | 0.6 |
| | | Ammonium hydroxide | 0.3 |
| | | N,N-bis(2-hydroxyethyl)-glycine | 0.5 |
| | | Ultrapure water | 74.9 |

TABLE 4

| Water-soluble coloring material (% by weight) | | Water-soluble organic solvent, other component (% by weight) | |
|---|---|---|---|

Color ink set 3

Cyan

| C.I. Direct Blue 199 | 2.3 | Diethylene glycol | 12.0 |
| (solution degree 15%) | | Diethylene glycol monobutyl ether | 5.0 |
| C.I. Acid Blue 9 | 0.2 | Surfynol 465 (manufactured by Nisshin Chemical Corp.) | 0.1 |
| (solubility 20% or more) | | Sodium hydroxide | 0.3 |
| | | N,N-bis(2-hydroxyethyl)-2-aminoethane sulfonic acid | 0.6 |
| | | Urea | 7.0 |
| | | Ultrapure water | 72.5 |

Magenta

| C.I. Acid Re 52 | 1.4 | Diethylene glycol | 11.0 |
| (solution degree 20% | | Diethylene glycol monobutyl ether | 6.0 |
| or more) | | Surfynol 465 (manufactured by Nisshin Chemical Corp.) | 0.1 |
| Formula (E-1) | 0.5 | Sodium hydroxide | 0.3 |
| (solubility 20% or more) | | N,N-bis(2-hydroxyethyl)-2-aminoethane sulfonic acid | 0.6 |
| | | Urea | 6.0 |
| | | Ultrapure water | 74.1 |

Yellow

| C.I. Direct Yellow 132 | 1.0 | Diethylene glycol | 11.0 |
| (solution degree 15%) | | Diethylene glycol monobutyl ether | 5.5 |
| C.I. Acid Yellow 23 | 1.0 | Pluronic PE 63 (manufactured by BASF Corp.) | 0.3 |
| (solubility 20% or more) | | Potassium hydroxide | 0.3 |
| | | N,N-bis(2-hydroxyethyl)-2-aminoethane sulfonic acid | 0.6 |
| | | Urea | 6.0 |
| | | Ultrapure water | 74.3 |

Color ink set 4

Cyan

| Formula (A-24) | 0.9 | Diethylene glycol | 12.0 |
| (solubility 5%) | | Diethylene glycol monobutyl ether | 5.0 |
| | | Surfynol 465 (manufactured by Nisshin Chemical Corp.) | 0.1 |
| | | Sodium hydroxide | 0.3 |
| | | N,N-bis(2-hydroxyethyl)-2-aminoethane sulfonic acid | 0.6 |
| | | Urea | 7.0 |
| | | Ultrapure water | 74.1 |

Magenta

| Formula (C-2) | 1.0 | Diethylene glycol | 11.0 |
| (solubility 6%) | | Diethylene glycol monobutyl ether | 6.0 |
| | | Surfynol 465 (manufactured by Nisshin Chemical Corp.) | 0.1 |
| | | Sodium hydroxide | 0.3 |
| | | N,N-bis(2-hydroxyethyl)-2-aminoethane sulfonic acid | 0.6 |
| | | Urea | 6.0 |
| | | Ultrapure water | 75.0 |

Yellow

| Formula (D-2) | 2.8 | Diethylene glycol | 11.0 |
| (solubility 6%) | | Diethylene glycol monobutyl ether | 5.5 |
| | | Pluronic PE 63 (manufactured by BASF Corp.) | 0.3 |
| | | Potassium hydroxide | 0.3 |
| | | N,N-bis(2-hydroxyethyl)-2-aminoethane sulfonic acid | 0.6 |
| | | Urea | 6.0 |
| | | Ultrapure water | 73.5 |

Regarding these inks, the following evaluations were conducted.

(1) Ink surface tension

The surface tension of ink was measured using a Wilhelmy type surface tension apparatus at 20° C. and 50% RH.

(2) Ink viscosity

The viscosity of ink was measured at a shearing rate of 1400 s$^{-1}$ and at 20° C. and 50% RH.

(3) Ink pH

The pH of ink was measured using a glass pH electrode at 20° C. and 50% RH.

(4) Mean volume diameter measurement

Mean volume diameter of black ink in its normal state was measured using a UPA 9340 manufactured by Microtrac Corp. at 20° C. and 50% RH. The viscosity arrived at in 2 above was used for this measurement. The results of these measurements are shown in Table 6 and 7.

TABLE 5

| Water-soluble coloring material (% by weight) | | Water-soluble organic solvent, other component (% by weight) | |
|---|---|---|---|

Color ink set 5

Cyan

| Formula (A-24)¥ | 2.0 | Diethylene glycol | 12.0 |
| (solubility 5%) | | Diethylene glycol monobutyl ether | 5.0 |
| C.I. Acid Blue 9 | 0.2 | Florad FC 170 C (manufactured by Three M Corp.) | 0.9 |
| (solubility 20% or more) | | Sodium hydroxide | 0.3 |
| | | N,N-bis(2-hydroxyethyl)-2-aminoethane sulfonic acid | 0.6 |
| | | Urea | 7.0 |
| | | Ultrapure water | 72.0 |

Magenta

| Formula (C-2) | 1.4 | Diethylene glycol | 11.0 |
| (solubility 6%) | | Diethylene glycol monobutyl ether | 6.0 |
| formula (E-1) | 0.5 | Florad FC 170 C (manufactured by Three M Corp.) | 0.9 |
| (solubility 20% or more) | | Sodium hydroxide | 0.3 |
| | | N,N-bis(2-hydroxyethyl)-2-aminoethane sulfonic acid | 0.6 |
| | | Urea | 6.0 |
| | | Ultrapure water | 73.3 |

Yellow

| Formula (D-1) | 2.0 | Diethylene glycol | 11.0 |
| (solubility 5%) | | Diethylene glycol monobutyl ether | 5.5 |
| C.I. Acid Yellow 23 | 1.0 | Florad FC 170 C (manufactured by Three M Corp.) | 0.9 |
| (solubility 20% or more) | | Potassium hydroxide | 0.3 |
| | | N,N-bis(2-hydroxyethyl)-2-aminoethane sulfonic acid | 0.6 |
| | | Urea | 6.0 |
| | | Ultrapure water | 74.0 |

Color ink set 6

Cyan

| Formula (A-24) | 2.0 | Sulfolane | 12.0 |
| (solubility 4%) | | Glyserin | 10.0 |
| C.I. Direct Blue 199 | 1.0 | Sodium hydroxide | 0.3 |
| (solubility 15%) | | N,N-bis(2-hydroxyethyl)-2-aminoethane sulfonic acid | 0.6 |
| | | Urea | 6.0 |
| | | Benzoic acid | 0.3 |
| | | Ultrapure water | 67.8 |

Magenta

| C.I. Direct Red 277 | 0.2 | Sulfolane | 12.0 |
| (solubility 12%) | | Glyserin | 10.0 |
| Formula (C-5) | 2.2 | Lithium hydroxide | 0.3 |
| (solubility 4%) | | N,N-bis(2-hydroxyethyl)-2-aminoethane sulfonic acid | 0.6 |
| | | Urea | 4.0 |
| | | Benzoic acid | 1.0 |
| | | Ultrapure water | 69.7 |

Yellow

| C.I. Direct Yellow 144 | 1.5 | Sulfolane | 12.0 |
| C.I. Acid Yellow 23 | 0.2 | Glyserin | 5.0 |
| (solubility 20% or more) | | Thiodiethanol | 5.0 |
| | | Ammonium hydroxide | 0.3 |
| | | N,N-bis(2-hydroxyethyl)-glycine | 0.5 |
| | | Ultrapure water | 75.5 |

TABLE 6

| | (1) Ink surface tension (mN/m) | (2) Ink viscosity (mPas) | (3) Ink pH | (4) Volume-average particle size (nm) | Notice |
|---|---|---|---|---|---|
| Black ink 1 | 49.0 | 1.90 | 7.9 | 100.0 | Ink pH was controlled using KOH |
| Black ink 2 | 55.0 | 2.12 | 8.1 | 90.2 | Ink pH was controlled using NaOH |
| Black ink 3 | 52.0 | 2.02 | 8.2 | 150.0 | Ink pH was controlled using $NH_4OH$ |
| Black ink 4 | 46.0 | 1.95 | 9.0 | 132.0 | Ink pH was controlled using Bicine/LiOH |

TABLE 6-continued

| | (1) Ink surface tension (mN/m) | (2) Ink viscosity (mPas) | (3) Ink pH | (4) Volume-average particle size (nm) | Notice |
|---|---|---|---|---|---|
| Black ink 5 | 52.0 | 1.92 | 7.3 | 98.0 | Ink pH was controlled using BES/NaOH |
| Black ink 6 | 38.0 | 2.10 | 7.9 | 112.0 | Ink pH was controlled using LiOH |
| Black ink 7 | 37.0 | 2.32 | 8.4 | 160.0 | Ink pH was controlled using Tricine/KOH |
| Black ink 8 | 28.0 | 2.05 | 8.2 | 90.0 | Ink pH was controlled using NH$_4$OH |
| Black ink 9 | 62.0 | 2.17 | 8.1 | 92.0 | Ink pH was controlled using KOH |
| Black ink 10 | 48.0 | 1.80 | 7.9 | — | Ink pH was controlled using KOH |

(5) Solubility of water-soluble coloring material

Aqueous solutions of concentrations prepared with the concentration of a water-soluble coloring material (dye) increasing by 1% by weight like 1, 2, 3, . . . % by weight based on 100 g of ultrapure water at 20° C., were stirred for 1 hour, then, passed through a 0.2 μm filter. Then, the maximum concentration (% by weight) at which the insoluble dye was not observed on the filter was defined as the solubility of the water-soluble coloring material. The results are shown together in the item of "water-soluble coloring material" in Tables 5 and 6.

(6) Image quality

Black ink and color ink were combined as shown in Table 7 and used as multicolor ink sets, using a prototype ink jet recording apparatus (heating method, 600 dpi, ink channel formed from a polyimide-based resin). Then, using each multicolor ink set, fullcolor printing was conducted on FX-L paper (Fuji Xerox Corp.), 4024 paper (Xerox Corp.), prototype OHP film especially for ink jet, and glossy paper.

An image made only of black letters and an image made of black letters printed in a color image were observed, and the image quality was evaluated with the following criteria.

O 8 points Gothic letters were legible

X 8 points Gothic letters were illegible (7) Fixation strength of black images

A fullcolor image was printed in the same manner as in the above-described test (6) and left for 24 hours. Black letter images, and 8 points Gothic letters on black letter images in cyan, magenta, yellow, blue or green color image were rubbed strongly by finger tip, and the fixation strength of the black image was evaluated according to the following standard.

O No stains formed around the image, and legible even after the rubbing

X Stains formed around the image, and illegible after rubbing

The results are shown in Table 8.

TABLE 7

| | | (1) Ink surface tension (mN/m) | (2) Ink viscosity (mPas) | (3) Ink pH |
|---|---|---|---|---|
| Color ink set 1 | Cyan | 34.0 | 2.10 | 9.1 |
| | Magenta | 34.5 | 2.05 | 9.0 |
| | Yellow | 36.2 | 2.20 | 8.8 |
| Color ink set 2 | Cyan | 36.0 | 2.30 | 8.6 |
| | Magenta | 36.8 | 2.42 | 8.4 |
| | Yellow | 35.0 | 2.33 | 8.4 |
| Color ink set 3 | Cyan | 35.5 | 2.36 | 8.8 |
| | Magenta | 35.8 | 2.42 | 8.5 |
| | Yellow | 35.1 | 2.33 | 8.6 |
| Color ink set 4 | Cyan | 34.8 | 2.30 | 8.6 |
| | Magenta | 36.2 | 2.62 | 8.3 |
| | Yellow | 35.5 | 2.31 | 8.3 |
| Color ink set 5 | Cyan | 18.0 | 2.20 | 9.1 |
| | Magenta | 18.2 | 2.15 | 9.0 |
| | Yellow | 17.6 | 2.30 | 8.8 |
| Color ink set 6 | Cyan | 52.1 | 2.29 | 8.6 |
| | Magenta | 53.0 | 2.36 | 8.4 |
| | Yellow | 51.3 | 2.30 | 8.5 |

TABLE 8

| | Black ink No. | Color ink No. | Image quality | | | | Black image fixation strength | | |
|---|---|---|---|---|---|---|---|---|---|
| | | | FX-L paper | 4024 paper | OHP | Gloss paper | FX-L paper | Gloss paper | Notice |
| Example | | | | | | | | | |
| 1 | 1 | 1 | O | O | O | O | O | O | |
| 2 | 2 | 1 | O | O | O | O | O | O | |
| 3 | 3 | 2 | O | O | O | O | O | O | |
| 4 | 4 | 2 | O | O | O | O | O | O | |

TABLE 8-continued

| | | | Image quality | | | Black image fixation strength | | |
|---|---|---|---|---|---|---|---|---|
| Black ink No. | Color ink No. | FX-L paper | 4024 paper | OHP | Gloss paper | FX-L paper | Gloss paper | Notice |
| 5 | 5 | 4 | ○ | ○ | ○ | ○ | ○ | ○ | Cyan and magenta were overprinted 1 to 3 times to exhibit gradation. |

Comparative Example

| | | | | | | | | |
|---|---|---|---|---|---|---|---|---|
| 1 | 7 | 3 | ○ | ○ | × | × | ○ | ○ | |
| 2 | 6 | 4 | × | × | × | × | × | × | Cyan and magenta were overprinted 1 to 3 times exhibit gradation. |
| 3 | 7 | 3 | ○ | ○ | × | × | ○ | ○ | |
| 4 | 6 | 3 | × | × | × | × | × | × | |
| 5 | 6 | 3 | × | × | × | × | × | × | |
| 6 | 8 | 1 | × | × | × | × | ○ | ○ | |
| 7 | 9 | 1 | × | × | × | × | × | × | |
| 8 | 2 | 5 | × | × | × | × | ○ | ○ | |
| 9 | 2 | 6 | × | × | × | × | × | × | |
| 10 | 10 | 1 | × | × | × | × | ○ | ○ | |
| 11 | 7 | 6 | × | × | × | × | × | × | |

According to the present invention, the above-described conventional problems can be solved. According to the present invention, there can be provided a multicolor ink set and ink jet recording method suitable for obtaining at high speed color images with excellent fixation, the color image satisfying the above-described desired ink properties, being excellent in water resistance, light resistance and the like, and being clear and providing suitable image concentration without blotting on any paper.

What is claimed is:

1. A multicolor ink set comprising:
   a black ink comprising at least a water-insoluble coloring material in which a carboxylic acid structure or a carboxylic salt structure is exposed to the surface, water, and a water-soluble organic solvent, and the black ink has a surface tension at 20° C. from 30 to 60 mN/m; and
   a color ink comprising at least one water-soluble coloring material selected from the group consisting of cyan, magenta and yellow, water, and a water-soluble organic solvent, and the color ink has a surface tension at 20° C. from 20 to 50 mN/m and lower than the surface tension of said black ink, and 50% by weight or more of said at least one water-soluble coloring material has a solubility in water at 20° C. of 10% by weight or less.

2. A multicolor ink set according to claim 1, wherein said water-insoluble coloring material is carbon black.

3. A multicolor ink set according to claim 2, wherein the carbon black has a primary particle size of 10 to 60 nm and a mean volume diameter in the black ink of 20 to 300 nm.

4. A multicolor ink set according to claim 1, wherein said water-insoluble coloring material is obtained by treating with a dispersing agent comprising at least a carboxylic acid structure or a carboxylate salt structure.

5. A multicolor ink set according to claim 4, wherein said dispersing agent is a polymeric dispersing agent.

6. A multicolor ink set according to claim 5, wherein said polymer dispersing agent has a weight-average molecular weight of 1000 to 10000.

7. A multicolor ink set according to claim 5, wherein said black ink has a viscosity at 20° C. of 1.5 to 5.0 mPas.

8. A multicolor ink set according to claim 1, wherein said black ink comprises 2 to 10% by weight of the water-insoluble coloring material.

9. A multicolor ink set according to claim 1, wherein the cyan coloring material is selected from phthalocyanine compounds represented by the following general formula (A) and phthalocyanine compounds represented by the following general formula (B), the magenta coloring material is selected from compounds represented by the following general formula (C), and the yellow coloring material is selected from C.I. Direct Yellow 144, C.I. Direct Yellow 86 and compounds represented by the following general formula (D):

General formula (A)

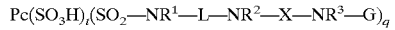

$$Pc(SO_3H)_t(SO_2-NR^1-L-NR^2-X-NR^3-G)_q$$

wherein Pc represents a phthalocyanine nucleus containing metal; $R^1$, $R^2$ and $R^3$ may be the same or different, and represent each independently a hydrogen atom, an alkyl group or a substituted alkyl group; L represents a divalent organic connecting group; G represents a colorless organic group substituted by at least one substituent selected from —COSH and —COOH; t+q is 3 to 4; X represents a carbonyl group, a group represented by the following formula (a), a group represented by the following formula (b), or a substituent represented by the following formula (c);

(a)

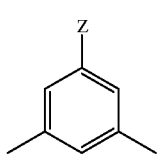

(b)

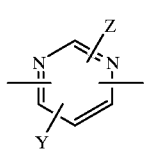

-continued

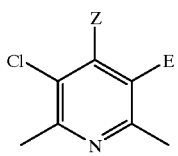
(c)

wherein Z represents —NR⁴ R⁵, —SR⁶ or —OR⁶, Y represents a hydrogen atom, Cl, a zinc atom, —SR⁷ or —OR⁷· E represents Cl or —CN, R⁴, R⁵, R⁶ and R⁷ represent a hydrogen atom, an alkyl group or a substituted alkyl group;

General formula (B)

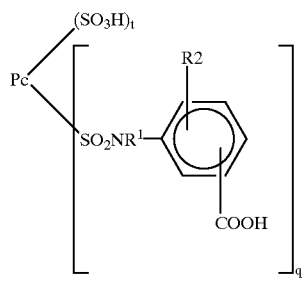
(B)

wherein Pc represents a phthalocyanine nucleus containing metal; R¹ represents a hydrogen atom, an alkyl group, a substituted alkyl group, an alkenyl group, a substituted alkenyl group, an aralkyl group or a substituted aralkyl group; R² represents a hydrogen atom, an alkyl group, an alkoxy group, a halogen group, an amino group or a substituted amino group; t+q is 3 to 4; and the general formula (B) has groups selected from —COSH and —COOH in a number equal to or more than that of —SO₃ H;

General formula (C)

wherein J represents a divalent substituent represented by the following formula;

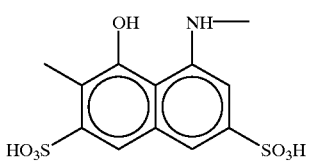

wherein, Ar¹ and Ar² may be the same or different, and represent an aryl group or substituted aryl group; at least one of Ar and Ar has at least one substituent selected from —COSH and —COOH; R¹ and R² may be the same or different, and represent a hydrogen atom, an alkyl group, a substituted alkyl group, an alkenyl group or a substituted alkenyl group; L represents a divalent organic connecting group; n is 0 or 1; X represents a carbonyl group, a group represented by the following formula (1), a group represented by the following formula (2) or a group represented by the following formula (3);

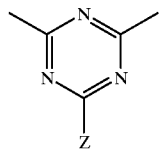
(1)

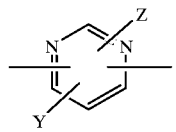
(2)

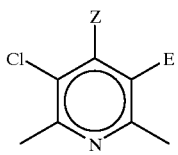
(3)

wherein, Z represents —NR³ R⁴, —SR⁵ or —OR⁵; Y represents a hydrogen atom, Cl, a zinc atom, —SR⁶ or —OR⁶; E represents Cl or —CN; R³, R⁴, R⁵ and R⁶ may be the same or different, and represent a hydrogen atom, an alkyl group, a substituted alkyl group, an alkenyl group, a substituted alkenyl group, an aralkyl group or a substituted aralkyl group; R³ and R⁴ may form a 5-membered or 6-membered ring together with a nitrogen atom;

General formula (D)

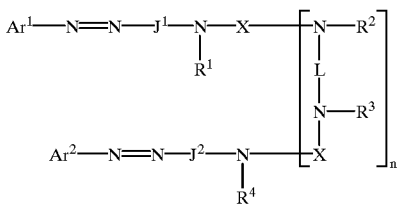
(D)

wherein, Ar¹ and Ar² may be the same or different, and represent an aryl group or substituted aryl group; at least one of Ar¹ and Ar² has at least one substituent selected from —COSH and —COOH; J¹ and J² may be the same or different, and represent a substituent represented by the following formula (1 ), a substituent represented by the following formula (2 ) or a substituent represented by the following formula (3 );

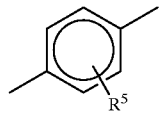
(1)

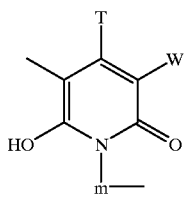
(2)

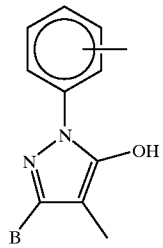
(3)

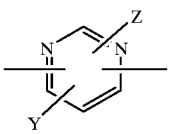
(5)

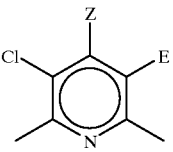
(6)

wherein, R⁵ represents a substituent selected from a hydrogen atom, an alkyl group, a substituted alkyl group, an alkoxyhalogen group, —CN, a ureide group and —NHCOR⁶; R⁶ represents a hydrogen atom, an alkyl group, a substituted alkyl group, an aryl group, a substituted aryl group, an aralkyl group or a substituted aralkyl group; T represents an alkyl group; W represents a hydrogen atom, —CN, —CONR¹⁰R¹¹, a pyridinium group or —COOH; m represents an alkylene chain having 2 to 8 carbon atoms; B represents a hydrogen atom, an alkyl group or —COOH;

R¹, R², R³, R⁴, R¹⁰ and R¹¹ may be the same or different, and represent a hydrogen atom, an alkyl group or a substituted alkyl group; L represents a divalent organic connecting group; X represents a carbonyl group, a substituent represented by the following formula (4), a substituent represented by the following formula (5) or a substituent represented by the following formula (6);

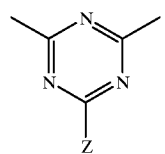
(4)

wherein, Z represents —OR⁷, —SR⁷ or —NR⁸R⁹; Y represents a hydrogen atom, Cl or —CN; E represents Cl or —CN; R⁷, R⁸ and R⁹ may be the same or different, and represent a hydrogen atom, alkyl group, a substituted alkyl group, an alkenyl group, a substituted alkenyl group, an aryl group, a substituted aryl group, an aralkyl group or a substituted aralkyl group; R⁸ and R⁹ may form a 5-membered or 6-membered ring together with a nitrogen atom;

n is 1 or 2; when said formula (5) does not have —SO₃H, it has at least two substituents selected from —COSH and —COOH.

10. A multicolor ink set according to claim 1, wherein the color ink comprises from 0.1 to 8% by weight of the water-soluble coloring material.

11. A multicolor ink set according to claim 1, wherein pH of the black ink and the color ink is from 6.0 to 10.0.

12. An inkjet recording method comprising recording by discharging ink drops of the multicolor ink set according to claim 1 through an orifice according to a recording signal.

13. An ink jet recording method according to claim 12, wherein the discharge of ink drops comprises a heating method.

14. An ink jet recording method according to claim 13, wherein the heating method comprises using a head comprising a polyimide resin.

15. A multicolor ink set according to claim 1, wherein the amount of the water-soluble coloring material is 0.5–2.0% by weight.

* * * * *